(12) United States Patent
Lee et al.

(10) Patent No.: US 11,829,557 B2
(45) Date of Patent: Nov. 28, 2023

(54) ELECTRONIC DEVICE AND OPERATION METHOD OF TOUCH SCREEN PANEL TO CHANGE INPUT TYPE

(71) Applicant: Samsung Electronics Co., Ltd., Suwon-si (KR)

(72) Inventors: Seungheon Lee, Suwon-si (KR); Jeonghun Kim, Suwon-si (KR); Keehyon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/893,669

(22) Filed: Aug. 23, 2022

(65) Prior Publication Data

US 2023/0049801 A1    Feb. 16, 2023

Related U.S. Application Data

(63) Continuation of application No. PCT/KR2022/011923, filed on Aug. 10, 2022.

(30) Foreign Application Priority Data

Aug. 10, 2021    (KR) .................. 10-2021-0105233

(51) Int. Cl.
*G06F 3/041* (2006.01)
*G06F 3/0488* (2022.01)

(52) U.S. Cl.
CPC ........ *G06F 3/0418* (2013.01); *G06F 3/0488* (2013.01); *G06F 2203/04105* (2013.01)

(58) Field of Classification Search
CPC ............... G06F 3/0418; G06F 3/0488; G06F 2203/04105
See application file for complete search history.

(56) References Cited

U.S. PATENT DOCUMENTS

| 2013/0120298 A1 | 5/2013 | Zhou | |
|---|---|---|---|
| 2016/0110006 A1* | 4/2016 | Hyde | .......... G06F 3/0418 345/173 |
| 2016/0224171 A1* | 8/2016 | Kim | .......... G06F 3/0412 |

(Continued)

FOREIGN PATENT DOCUMENTS

| CN | 101963863 A | 2/2011 |
|---|---|---|
| CN | 110637282 B | 3/2021 |

(Continued)

OTHER PUBLICATIONS

International Search Report dated Nov. 14, 2022, issued in International Application No. PCT/KR2022/011923.

*Primary Examiner* — David D Davis
(74) *Attorney, Agent, or Firm* — Jefferson IP Law, LLP

(57) ABSTRACT

An electronic device and a method of operating the same are provided. The electronic device includes a touch screen, and at least one processor configured to determine, as any one of a first touch type or a second touch type, a type of a user input inputted on the touch screen, output a user interface (UI) corresponding to the first touch type based on the type of inputted touch being determined as the first touch type, correct the determined type as the second touch type based on an error being determined to be present in determining the type of inputted touch as the first touch type, and output a UI corresponding to the second touch type.

19 Claims, 14 Drawing Sheets

(56) References Cited

U.S. PATENT DOCUMENTS

| | | | |
|---|---|---|---|
| 2017/0031526 A1* | 2/2017 | Hyde | G06F 3/041 |
| 2018/0095596 A1* | 4/2018 | Turgeman | G06F 3/0346 |
| 2018/0224990 A1* | 8/2018 | Shim | G06F 1/1643 |
| 2020/0012382 A1* | 1/2020 | Lee | G06F 3/04186 |
| 2020/0117308 A1* | 4/2020 | Heo | G06F 3/0416 |
| 2020/0341611 A1 | 10/2020 | Xu | |

FOREIGN PATENT DOCUMENTS

| | | |
|---|---|---|
| KR | 10-2011-0113141 A | 10/2011 |
| KR | 10-1577277 B1 | 12/2015 |
| KR | 10-2016-0096008 A | 8/2016 |
| KR | 10-1749031 B1 | 6/2017 |
| KR | 10-2018-0017500 A | 2/2018 |
| KR | 10-2019-0104101 A | 9/2019 |
| KR | 10-2019-0109805 A | 9/2019 |

* cited by examiner

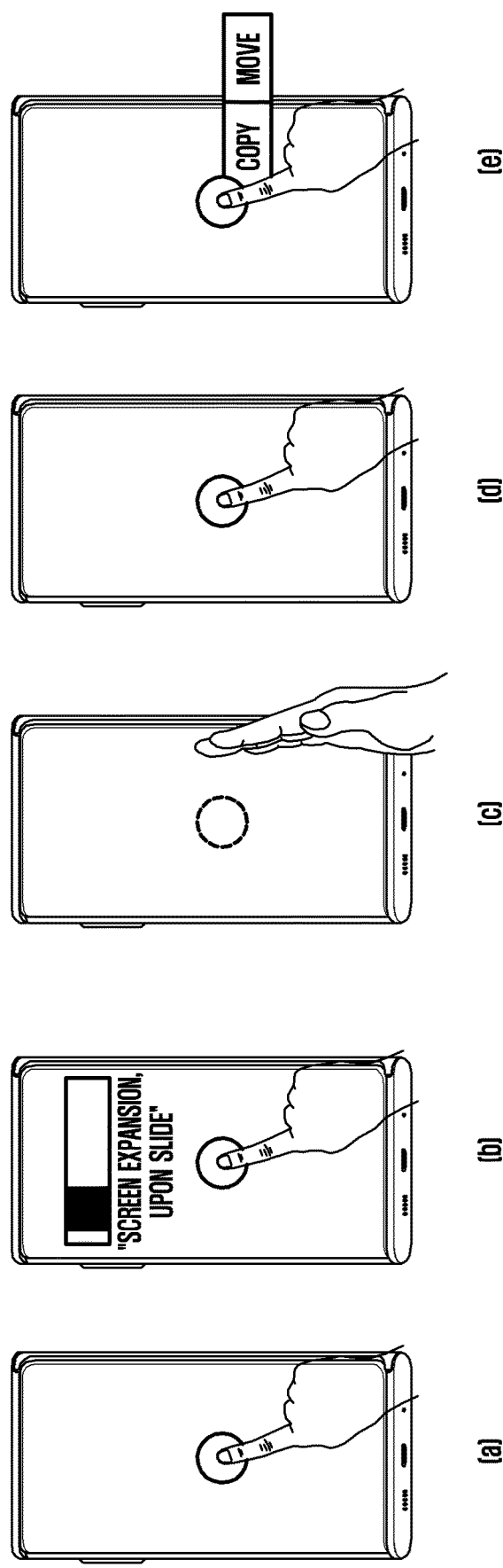

[e]

[d]

[c]

[b]

[a]

ELECTRONIC DEVICE AND OPERATION METHOD OF TOUCH SCREEN PANEL TO CHANGE INPUT TYPE

CROSS-REFERENCE TO RELATED APPLICATION(S)

This application is a continuation application, claiming priority under § 365(c), of an International application No. PCT/KR2022/011923, filed on Aug. 10, 2022, which is based on and claims the benefit of a Korean patent application number 10-2021-0105233, filed on Aug. 10, 2021, in the Korean Intellectual Property Office, the disclosure of which is incorporated by reference herein in its entirety.

TECHNICAL FIELD

The disclosure relates to an electronic device including a touch screen panel and a method of the electronic device. More particularly, the disclosure relates to an electronic device which determines the type of touch inputted to a touch screen panel and determines whether an error is present in a touch type determination and a method of the electronic device.

BACKGROUND ART

A touch screen panel means a screen which enables a command from a user to be directly received by identifying a corresponding location when a touch target (e.g., a part of the body of the user) of the user reaches (or touches) a letter or a specific location displayed on a screen without using a keyboard. Such a touch screen panel is widely used in large-sized display devices, such as display devices and smart television (TV) in public facilities, in addition to portable display devices, such as smartphone and tablet PCs, because a display device and an input device are integrated.

A touch screen is input means in which a touch target, such as a finger, a touch pen, a stylus pen, or a pointer, touches an area of a display to which a screen is outputted, and may obtain various inputs depending on touch methods. For example, the touch screen may receive various touch inputs including a force touch, a long press, a short (or tap) touch, a long touch, a multi-touch, a drag touch, a flick touch, a pinch-in touch, a pinch-out touch, a swype touch, and a hovering touch. In general, a force touch input may be a touch input shortly inputted with relatively great pressure compared to a long touch input. A long touch input may be a touch input long inputted with relatively small pressure compared to a force touch input.

However, in the case of some users, there is a risk of confusion about the force touch input and the long touch input due to the presence of an area in which a pressure condition for the force touch input and a duration condition for the long touch input are intersected. For example, some users may apply pressure for the force touch input smaller than that of other users for a long time.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide a user convenience function by determining the type of touch inputted to a touch screen panel and updating a touch type determination model personalized for a user or correcting a touch type based on whether an error is present in a touch type determination.

Another aspect of the disclosure is to provide an electronic device to determine whether an error is present in a touch type determination based on a user behavior after determining the type of touch (e.g., a force touch and/or a long touch) inputted to a touch screen panel, and may update a touch type determination model.

For example, an electronic device disclosed in this document is to determine, as a force touch or a long touch, a touch inputted to a touch screen panel based on an input element, such as coordinates, a time or an area of the touch. The electronic device may output a user interface (UI) corresponding to a determined touch type, such as "a selection window for copying or moving an area selected by a touch", "a volume adjustment window", or "the expansion of a rollable display", based on the determined type. When a designated operation, such as "a user detaches his or her finger from a touch screen without manipulating a UI" after a UI output, the electronic device may determine that an error is present in a touch type determination. The electronic device may store touch data in a database by classifying the touch data based on a subsequent behavior of a user, and may update a model for classifying touch types based on the stored touch data.

Another aspect of the disclosure is to provide, an electronic device to correct a touch type when it is determined that an error is present in the touch type determined with respect to an inputted touch, and may output a UI related to the corrected touch type again.

For example, an electronic device disclosed in this document may output a UI related to a long touch again although an additional user behavior is not present when it is determined that an error is present in a determination of an inputted touch as a force touch as a user's intention is determined as the long touch after the inputted touch is determined as the force touch.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a touch screen and at least one processor. The at least one processor may determine, as any one of a first touch type or a second touch type, the type of user input inputted on the touch screen, output a user interface (UI) corresponding to the first touch type based on the type of inputted touch being determined as the first touch type, correct the determined type as the second touch type based on an error being determined to be present in determining the type of inputted touch as the first touch type, and output a UI corresponding to the second touch type.

In accordance with another aspect of the disclosure, a method of an electronic device is provided. The method includes determining, as any one of a first touch type or a second touch type, the type of user input inputted on the touch screen, outputting a UI corresponding to the first touch type based on the type of inputted touch being determined as the first touch type, correcting the determined type as the second touch type based on an error being determined to be present in determining the type of inputted touch as the first touch type, and outputting a UI corresponding to the second touch type.

Advantageous Effects

For example, an electronic device can determine whether an error is present in a touch type determination based on a user behavior after a touch type is determined.

For example, an electronic device can update a touch type determination model by learning data according to an individual characteristic of a user.

For example, an electronic device can generate a touch type determination model personalized for a user.

For example, an electronic device can reduce a type classification error of a long touch and a force touch by updating a touch type determination model based on an individual characteristic of a user.

For example, an electronic device can accurately recognize a touch type.

For example, an electronic device can correct a touch type when an error is present in a touch type determination.

For example, an electronic device can output a UI related to a corrected touch type when an error is present in a touch type determination.

For example, a user can be provided with a UI related to a corrected touch type even without an additional behavior although a touch type recognition error occurs in an electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 4A, 4B, 4C, 4D, and 4E are diagrams illustrated to describe a determining, by a processor, a touch type of an inputted touch and determining whether an error is present in the touch type according to various embodiments of the disclosure;

The same reference numerals are used to represent the same elements throughout the drawings.

MODE FOR DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
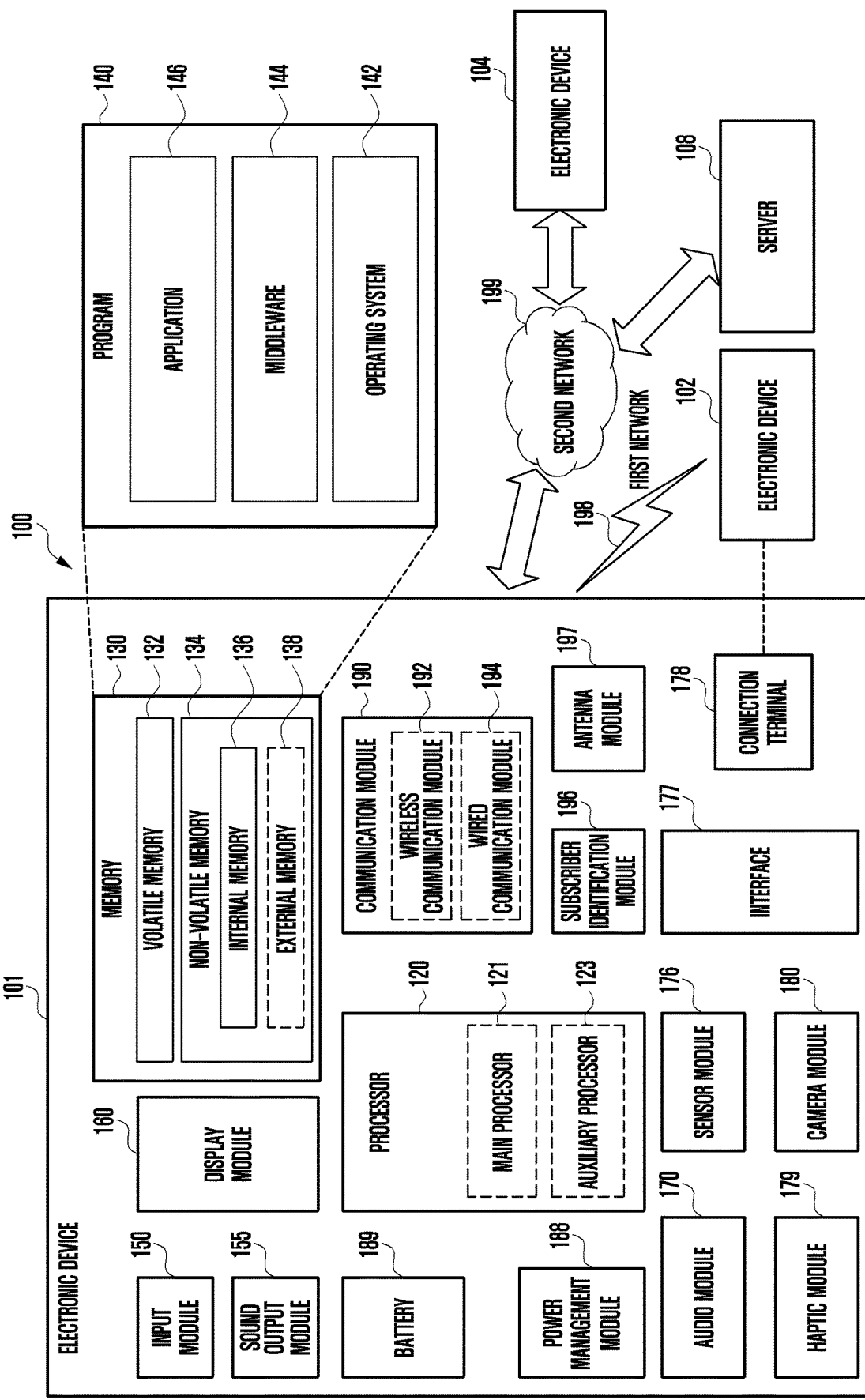
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. The non-volatile memory 134 may include an internal memory 136 or an external memory 138. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., through wires) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., through wires) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
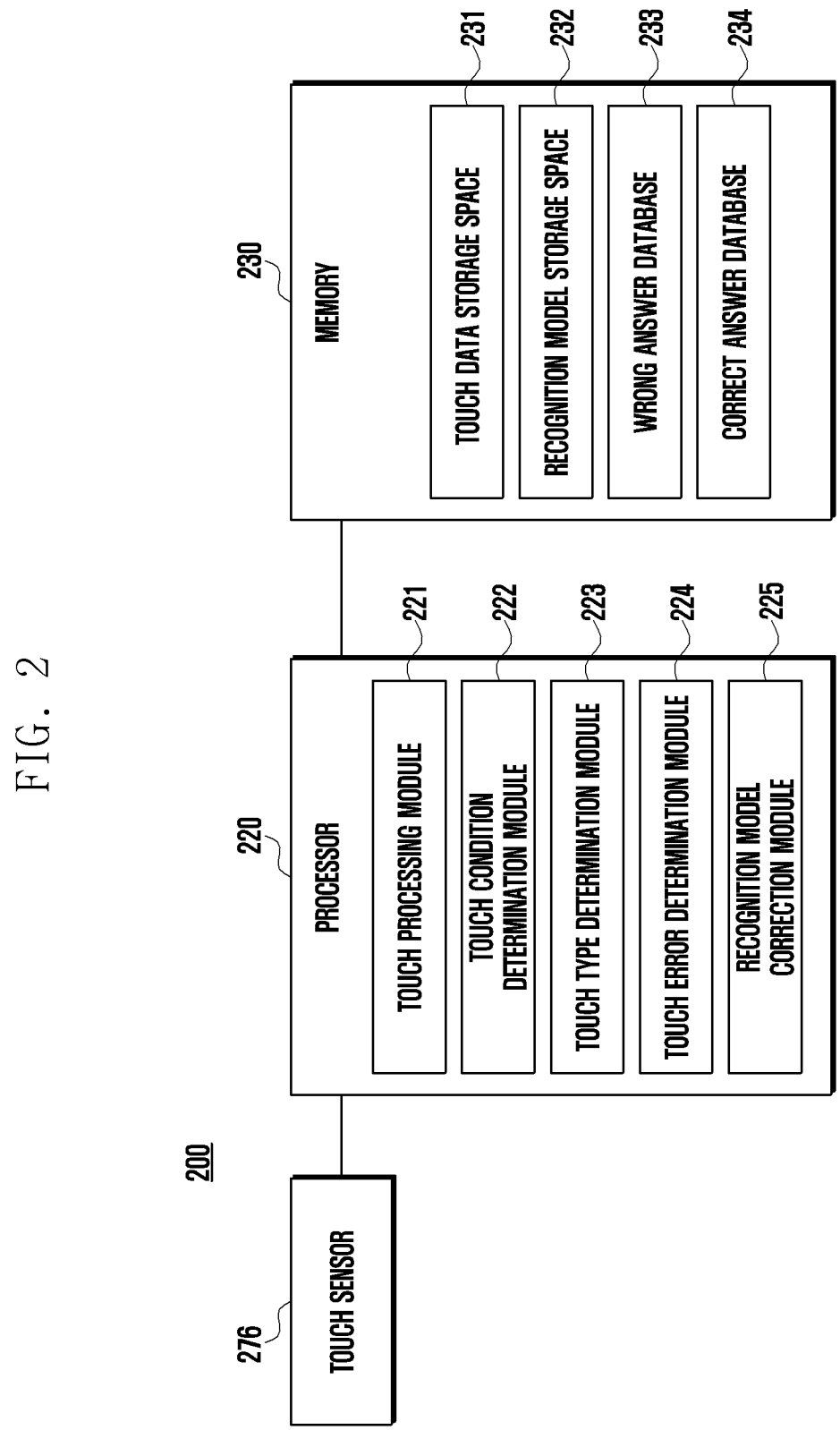
FIG. 2 is a block diagram of an electronic device according to an embodiment of the disclosure.

FIG. 2 is a block diagram of an electronic device according to an embodiment of the disclosure.

Referring to FIG. 2, an electronic device 200 (e.g., the electronic device 101 in FIG. 1) may include a processor 220 (e.g., the processor 120 in FIG. 1), a memory 230 (e.g., the memory 130 in FIG. 1) and/or a touch sensor 276 (e.g., the sensor module 176 in FIG. 1). The elements included in FIG. 2 relate to some of the elements included in the electronic device 200, and the electronic device 200 may include various elements as illustrated in FIG. 1 in addition to the some of the elements.

The touch sensor 276 according to various embodiments may include a touch screen panel (TSP). The TSP may operate according to at least one of a capacitive method, a resistive method, an infrared method, an acoustic method, or a pressure method.

The touch sensor 276 according to an embodiment may be configured to detect at least one of location coordinates or an area when a touch target that applies a touch on a touch screen touches the touch sensor 276, pressure upon touch, or capacitance upon touch. The touch target is an object that applies a touch to the touch sensor 276, and may be an object capable of coming into contact with the touch sensor 276, such as a finger, a touch pen, a stylus pen or a pointer, for example.

The touch sensor 276 according to an embodiment may detect touches using various methods, such as a short (or tap) touch, a long touch, a multi-touch, a drag touch, a flick touch, a pinch-in touch, a pinch-out touch, a swype touch, a hovering touch and/or a force touch on a touch screen.

For example, the force touch may be a touch type in which location coordinates of a touch are maintained within a designated range of the first touch location coordinates and pressure upon touch is designated pressure or more.

For example, the long touch may be a touch type in which location coordinates of a touch inputted in a touch screen is maintained within a designated range of the first touch location coordinates and a touch maintenance time is a designated time or more.

According to an embodiment of the disclosure, the touch sensor 276 may include a TSP using the capacitive method. For example, the touch sensor 276 may include a substrate on both sides of which special conductive metal is coated to form a transparent electrode, and may detect a touch based on location coordinates where a capacitance change occurs when a touch target comes into contact with a touch screen.

According to an embodiment of the disclosure, the touch sensor 276 may include a TSP using the resistive method. For example, the touch sensor 276 may include two sheets of substrates on which a transparent electrode layer is coated, and may detect a touch based on location coordinates of the substrates brought into contact with each other by pressure when a touch target comes into contact with a touch screen.

According to an embodiment of the disclosure, the touch sensor 276 may include a TSP using the infrared method. For example, the touch sensor 276 may include a plurality of light-emitting devices and light-receiving devices, and may detect a touch based on location coordinates of a portion against which a ray is cut off when a touch target comes into contact with a touch screen.

According to an embodiment of the disclosure, the touch sensor 276 may include a TSP using the acoustic method. For example, the touch sensor 276 may include a sound wave transducer for generating a sound wave on a surface thereof, and may detect a touch based on a change in the amplitude of a wave when a touch target comes into contact with a touch screen.

According to an embodiment of the disclosure, the touch sensor 276 may include a TSP using the pressure method. For example, the touch sensor 276 may include a pressure sensor capable of measuring touch pressure, and may detect a touch based on pressure applied to a touch screen by a touch target.

The touch sensor 276 according to an embodiment may be configured to convert, into an electrical input signal, pressure applied on a touch screen, a change in capacitance, a change in the amplitude of a wave, or a change in the ray.

The processor 220 according to various embodiments may include a touch processing module 221, a touch condition determination module 222, a touch type determination module 223, a touch error determination module 224 and/or a recognition model correction module 225.

The processor 220 according to an embodiment of the disclosure may be configured as at least one processor unit or may be implemented as one package. The processor unit may include an application processor, a touch IC, a display control IC and/or a separate microprocessor. In the processor 220 according to an embodiment of the disclosure, at least one of the touch processing module 221, the touch condition determination module 222, the touch type determination module 223, the touch error determination module 224 or the recognition model correction module 225 may be implemented in a touch IC.

The touch processing module 221 according to an embodiment of the disclosure may process a touch input signal obtained from the touch sensor 276. For example, the touch processing module 221 may obtain, from the touch sensor 276, touch data corresponding to a touch input signal. For example, touch data may be a sequence of data obtained by processing continuously collected input signals. For example, touch data may be image data corresponding to a touch input signal. For example, touch data may be image data related to touch location coordinates, a touch area and a touch maintenance time as a touch target comes into contact with a touch screen.

The touch processing module 221 according to an embodiment may generate coordinate data corresponding to an input signal obtained from the touch sensor 276.

The touch processing module 221 according to an embodiment may deliver coordinate data to some modules included in the processor 220. A corresponding module may convert the coordinate data into data having a display scale and process the data so that the data can be used in an OS framework. The touch processing module 221 may determine a touch event (e.g., a short (or tap) touch, a multi-touch, a drag touch, a flick touch, a pinch-in touch, a pinch-out touch, a swype touch and/or a hovering touch) corresponding to an input signal based on the input signal obtained from the touch sensor 276, and may deliver the determined touch event to an OS framework operating in an application processor.

The touch processing module 221 according to an embodiment may store touch data in a touch data-temporary storage space 231.

The touch condition determination module 222 according to an embodiment may determine whether a user input satisfies a condition for determining a touch type. For example, the touch condition determination module 222 may obtain, from the touch processing module 221, touch data and/or coordinate data including touch location coordinates. The touch condition determination module 222 may determine that a touch has satisfied a condition for determining a touch type based on touch location coordinates being maintained within a designated range of the first touch location coordinates and a touch maintenance time exceeding a designated time (e.g., 300 msec). For example, the touch condition determination module 222 may deliver notification to the touch type determination module 223 based on touch data and/or coordinate data satisfying a designated condition.

The touch type determination module 223 according to an embodiment may determine a touch type of a user input. For example, the touch type determination module 223 may determine a touch type as a first touch type and/or a second touch type. For example, the first touch type and/or the second touch type may be a long touch and/or a force touch.

For example, the touch type determination module 223 may obtain, from the touch data-temporary storage space 231, touch data corresponding to a user input based on notification indicating that a user input has satisfied a designated condition, which is obtained from the touch condition determination module 222. For example, the touch type determination module 223 may determine a touch type of touch data based on a recognition model stored in a recognition model storage space 232. For example, the touch type determination module 223 may determine a touch type as a touch of any one of the first touch type and/or the second touch type based on a value obtained by inputting touch data to a recognition model. For example, the touch type determination module 223 may determine a touch type as the first touch type based on a value obtained by inputting touch data to a recognition model, which is a designated value or more, and may determine the touch type as the second touch type based on the value being less than the designated value. For example, the touch type determination module 223 may deliver a determined touch type to a main processor (e.g., the main processor 121 in FIG. 1).

According to an embodiment of the disclosure, the main processor 121 may perform an operation based on a determined touch type. For example, the main processor 121 may output a UI corresponding to a touch type. For example, the main processor 121 may output a UI (e.g., a volume adjustment window UI and/or screen size adjustment) corresponding to the first touch type. For example, the main processor 121 may output a UI (e.g., a selection window UI for copying or moving a selected area) corresponding to the second touch type. According to an embodiment of the disclosure, the main processor 121 may output a UI corresponding to a touch type previously set in an application, based on the application being executed.

The touch error determination module 224 according to an embodiment may determine whether an error is present in a touch type determined by the touch type determination module 223.

According to an embodiment of the disclosure, the touch error determination module 224 may determine whether an error is present in a touch type determination of the touch type determination module 223 based on a designated condition being satisfied.

For example, the touch error determination module 224 may determine that an error is present in a determination of a touch type (e.g., the first touch type) based on an additional manipulation being not received from a user with respect to a UI related to the first touch type and touch location coordinates being made to disappear as a touch target coming into contact with a touch screen is separated, after the touch type determination module 223 determines an inputted touch as the first touch type and the main processor 121 outputs the UI related to the first touch type.

For example, the touch error determination module 224 may determine that an error is present in a determination of a touch type (e.g., the second touch type) based on an additional manipulation being not received from a user with respect to a UI related to the second touch type and a touch target touching another area of a touch screen, after the touch type determination module 223 determines an inputted touch as the second touch type and the main processor 121 outputs the UI related to the second touch type.

For example, the touch error determination module 224 may determine that an error is present in a determination of a touch type (e.g., the second touch type) based on an additional manipulation being not received from a user with respect to a UI related to the second touch type and a physical key (e.g., volume adjustment and/or screen size adjustment) being manipulated by the user, after the touch type determination module 223 determines an inputted touch as the second touch type and the main processor 121 outputs the UI related to the second touch type.

According to an embodiment of the disclosure, the touch error determination module 224 may determine that an error is not present in a touch type determination of the touch type determination module 223 based on a designated condition being satisfied. For example, the touch error determination module 224 may determine that an error is not present in a touch type determination of the touch type determination module 223 based on an input being obtained from a user and manipulating a UI corresponding to a determined touch type. For example, the touch error determination module 224 may determine that an error is not present in a touch type determination as the first touch type based on an input being obtained from a user and manipulating a first touch type UI. For example, the touch error determination module 224 may determine that an error is not present in a touch type determination as the second touch type based on an input being obtained from a user and manipulating a second touch type UI.

The touch error determination module 224 according to an embodiment may store touch data in a wrong answer database 233 based on the error being determined to be present in the touch type determination of the touch type determination module 224.

For example, the touch error determination module 224 may store corresponding touch data in the wrong answer database 233 by labeling the touch data with a "first touch type wrong answer" based on an error being determined to be present in the touch data determined as the first touch type by the touch type determination module 223. For example, the touch error determination module 224 may store corresponding touch data in the wrong answer database 233 by labeling the touch data with a "second touch type wrong answer" based on an error being determined to be present in the touch data determined as the second touch type by the touch type determination module 223.

The touch error determination module 224 according to an embodiment may store touch data in a correct answer database 234 based on an error being determined to be not present in a touch type determination of the touch type determination module 224.

For example, the touch error determination module 224 may store corresponding touch data in the correct answer database 234 by labeling the touch data with a "first touch type correct answer" based on an error being determined to be not present in the touch data determined as the first touch type by the touch type determination module 223. For example, the touch error determination module 224 may store corresponding touch data in the correct answer database 233 by labeling the touch data with a "second touch type correct answer" based on an error being determined to be not present in the touch data determined as the second touch type by the touch type determination module 223.

The recognition model correction module 225 according to an embodiment may update a recognition model stored in the recognition model storage space 232 based on touch data stored in the wrong answer database 233 and the correct answer database 234.

According to an embodiment of the disclosure, the recognition model correction module 225 may update a recognition model based on a designated condition being satisfied. For example, the recognition model correction module 225 may update a recognition model based on the amount of touch data being stored in the wrong answer database 233 and/or the correct answer database 234 and being equal to or greater than a designated value. For example, the recognition model correction module 225 may update a recognition model based on the electronic device 200 being not driven, the amount of remaining battery power of the electronic device 200 being equal to or greater than a designated value and/or a temperature of the electronic device 200 being equal to or smaller than a designated value. According to an embodiment of the disclosure, some of a recognition model update operation may be performed in an external server (not illustrated).

According to an embodiment of the disclosure, the recognition model correction module 225 may determine a recognition model based on touch data stored in the wrong answer database 233 and/or the correct answer database 234.

According to an embodiment of the disclosure, the recognition model correction module 225 may determine a recognition model by learning (or adaptively learning) touch data stored in the wrong answer database 233 and/or the correct answer database 234. For example, the recognition model correction module 225 may determine a recognition model by learning at least one of touch data labeled with a "first touch type wrong answer" and touch data labeled with a "second touch type wrong answer", which are stored in the wrong answer database 233, and touch data labeled with a "first touch type correct answer" and touch data labeled with a "second touch type correct answer", which are stored in the correct answer database 234. For example, the recognition model correction module 225 may determine a recognition model that determines a type of the first touch type and/or the second touch type by learning touch data stored in the wrong answer database 233 and/or the correct answer database 234. For example, the recognition model correction module 225 may determine a recognition pattern which is a criterion for determining a type of the first touch type and/or the second touch type by learning touch data stored in the wrong answer database 233 and/or the correct answer database 234.

According to an embodiment of the disclosure, the recognition model correction module 225 may determine a recognition model to be used in the touch type determination module 223, among a plurality of recognition models stored in the recognition model storage space 232, based on touch data stored in the wrong answer database 233 and/or the correct answer database 234. For example, the recognition model correction module 225 may input, to a plurality of recognition models, touch data stored in the wrong answer database 233 and/or the correct answer database 234, and may determine a recognition model having the highest recognition performance as a recognition model to be used in the touch type determination module 223. For example, the recognition model correction module 225 may determine, as a recognition model to be used in the touch type determination module 223, a recognition model based on a recognition pattern having the highest recognition rate by analyzing touch data stored in the wrong answer database 233 and/or the correct answer database 234.

According to an embodiment of the disclosure, the recognition model correction module 225 may update the recognition model storage space 232 with a determined recognition model. According to an embodiment of the disclosure, the recognition model correction module 225 may determine, as a recognition model to be used in the touch type determination module 223, a recognition model determined among a plurality of recognition models of the recognition model storage space 232.

The memory 230 according to various embodiments of the disclosure may include the touch data-temporary storage space 231, the recognition model storage space 232, the wrong answer database 233 and/or the correct answer database 234.

The touch data-temporary storage space 231 according to an embodiment may temporarily store touch data obtained from the touch processing module 221. According to an embodiment of the disclosure, the touch type determination module 223 may determine a touch type by obtaining touch data stored in the touch data-temporary storage space 231.

The recognition model storage space 232 according to an embodiment may temporarily or non-temporarily store a recognition model used by the touch type determination module 223 in order to determine a touch type of touch data. According to an embodiment of the disclosure, the recognition model storage space 232 may temporarily or non-temporarily store a plurality of recognition models having different types. According to an embodiment of the disclosure, the recognition model correction module 225 may update a recognition model stored in the recognition model storage space 232.

The wrong answer database 233 according to an embodiment of the disclosure may temporarily or non-temporarily store touch data determined as a wrong answer by the touch error determination module 224.

The correct answer database 234 according to an embodiment of the disclosure may temporarily or non-temporarily store touch data determined as a correct answer by the touch error determination module 224.

According to an embodiment of the disclosure, the wrong answer database 233 and the correct answer database 234 may be implemented as one database without physical or logical distinction. In all embodiments disclosed hereinafter, the wrong answer database and the correct answer database used to update a recognition model may be the one database. For example, the one database may be the same storage space in which touch data is labeled by being classified as a "wrong answer" or a "correct answer."

According to an embodiment of the disclosure, the recognition model correction module 225 may update a recognition model based on touch data stored in the wrong answer database 233 and/or the correct answer database 234.

Figure 3:
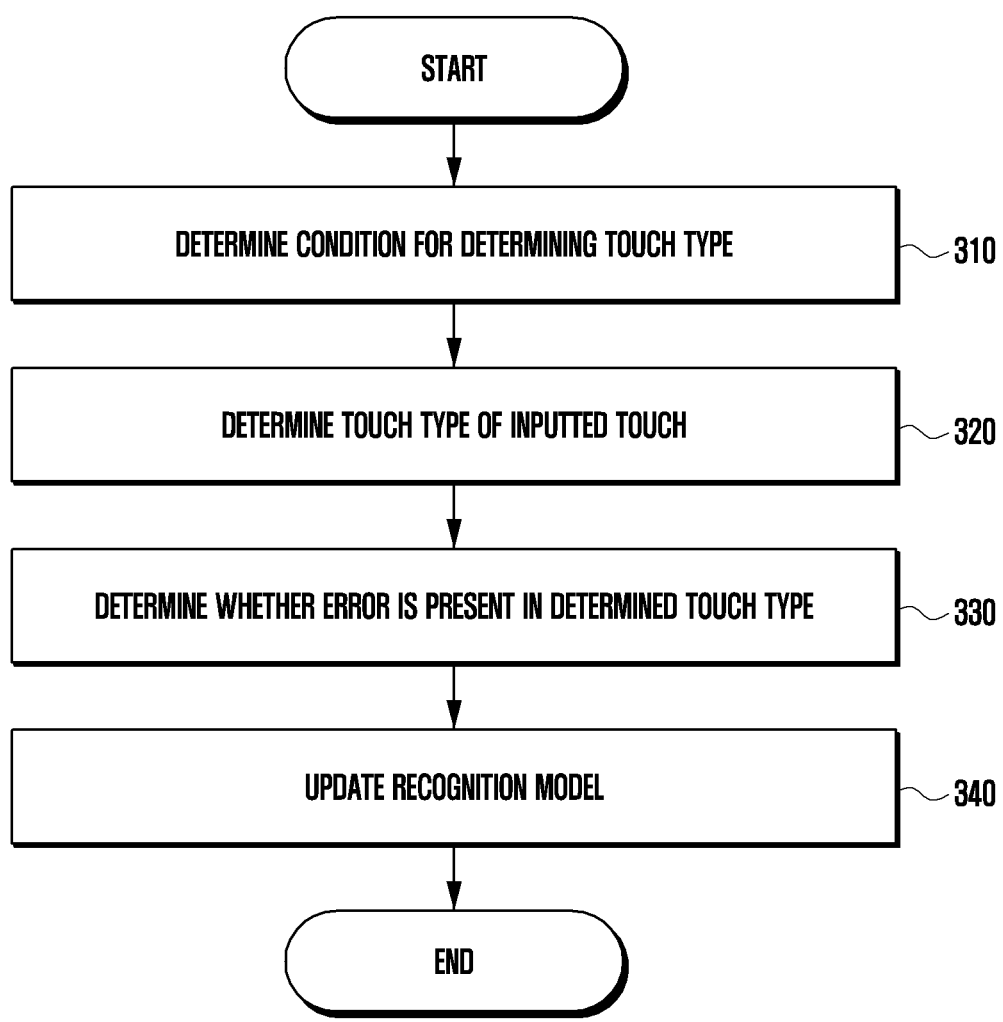
FIG. 3 is a flowchart illustrating a method of determining, by a processor, that an error of a touch type and controlling an electronic device to update a recognition model according to an embodiment of the disclosure.

FIG. 3 is a flowchart illustrating a method of determining, by a processor that an error of a touch type and controlling an electronic device to update a recognition model according to an embodiment of the disclosure.

Referring to FIG. 3, at operation 310, the processor 220 according to various embodiments of the disclosure may determine a condition for determining a touch type.

The processor 220 according to an embodiment may process a touch input signal obtained from a touch sensor (e.g., the touch sensor 276 in FIG. 2). For example, the processor 220 may obtain, from the touch sensor 276, touch data corresponding to the touch input signal. For example, the touch data may be a sequence of data obtained by processing continuously collected input signals. For example, the touch data may be image data corresponding to the touch input signal. For example, the touch data may be image data related to touch location coordinates, a touch area and a touch maintenance time as a touch target comes into contact with a touch screen.

The processor 220 according to an embodiment of the disclosure may generate coordinate data corresponding to an input signal obtained from the touch sensor 276. The processor 220 according to an embodiment may convert the coordinate data into data having a display scale, and may process the data so that the data can be used in an OS framework. According to an embodiment of the disclosure, a touch IC may perform the generation of the coordinate data. An application processor in which the OS framework operates may convert the coordinate data into the data having a display scale by performing up-scaling based on display resolution. In this case, the up-scaling process may be implemented in a way to multiply the coordinate data by a given constant.

The processor 220 according to an embodiment of the disclosure may store touch data in the touch data-temporary storage space 231.

The processor 220 according to an embodiment of the disclosure may determine whether a user input satisfies a condition for determining a touch type. For example, the processor 220 may determine that a touch has satisfied a condition for determining a touch type based on touch location coordinates being maintained within a designated range of the first touch location coordinates and a touch maintenance time exceeding a designated time (e.g., 300 msec).

At operation 320, the processor 220 according to various embodiments of the disclosure may determine a touch type of an inputted touch.

The processor 220 according to an embodiment of the disclosure may determine a touch type of a user input. For example, the processor 220 may determine a touch type as a first touch type and/or a second touch type. For example, the first touch type and/or the second touch type may be a long touch and/or a force touch.

For example, the processor 220 may obtain, from the touch data-temporary storage space 231, touch data corresponding to a user input. For example, the processor 220 may determine a touch type of the touch data based on a recognition model stored in the recognition model storage space 232. For example, the processor 220 may determine the touch type as the first touch type and/or the second touch type based on a value obtained by inputting the touch data to the recognition model. For example, the processor 220 may determine the touch type as the first touch type based on a value obtained by inputting the touch data to the recognition model, which is a designated value or more, and may determine the touch type as the second touch type based on the value being less than the designated value.

According to an embodiment of the disclosure, the processor 220 may perform an operation based on a determined touch type. For example, the processor 220 may output a UI corresponding to a touch type. For example, the processor 220 may output a first touch type UI (e.g., a volume adjustment window UI and/or screen size adjustment) based on a touch type being determinate as the first touch type. For example, the processor 220 may output a second touch type UI (e.g., a selection window UI for copying or moving a selected area) based on a touch type determined as the second touch type. According to an embodiment of the disclosure, the processor 220 may output a UI corresponding to a touch type previously set in an application based on the application being executed.

At operation 330, the processor 220 according to various embodiments may determine whether an error is present in the determined touch type.

According to an embodiment of the disclosure, the processor 220 may determine that an error is present in a touch type determination based on a designated condition being satisfied.

For example, the processor 220 may determine that an error is present in a determination of a touch type (e.g., the first touch type) based on an additional manipulation being not received from a user with respect to a UI related to the first touch type and touch location coordinates being made to disappear as a touch target coming into contact with a touch screen is separated within a designated time, after an inputted touch is determined as the first touch type and the UI related to the first touch type is outputted.

For example, the processor 220 may determine that an error is present in a determination of a touch type (e.g., the second touch type) based on an additional manipulation being not received from a user with respect to a UI related to the second touch type and a touch target touching another area of a touch screen, after an inputted touch is determined as the second touch type and the UI related to the second touch type is outputted.

For example, the processor 220 may determine that an error is present in a determination of a touch type (e.g., the second touch type) based on an additional manipulation being not received from a user with respect to a UI related to the second touch type and a physical key (e.g., volume adjustment and/or screen size adjustment) being manipulated by the user, after an inputted touch is determined as the second touch type and the UI related to the second touch type is outputted.

According to an embodiment of the disclosure, the processor 220 may determine that an error is not present in a touch type determination based on a designated condition being satisfied. For example, the processor 220 may determine that an error is not present in a touch type determination based on an input being obtained from a user and manipulating a UI corresponding to a determined touch type. For example, the processor 220 may determine that an error is not present in a touch type determination as the first touch type based on an input being obtained from a user and manipulating a first touch type UI. For example, the processor 220 may determine that an error is not present in a touch type determination as the second touch type based on an input being obtained from a user and manipulating a second touch type UI.

The processor 220 according to an embodiment of the disclosure may store touch data in the wrong answer database 233 based on an error being determined to be present in a touch type determination.

For example, the processor 220 may store corresponding touch data in the wrong answer database 233 by labeling the touch data with a "first touch type wrong answer" based on an error being determined to be present in the touch data determined as the first touch type. For example, the processor 220 may store corresponding touch data in the wrong answer database 233 by labeling the touch data with a "second touch type wrong answer" based on an error being determined to be present in the touch data determined as the second touch type.

The processor 220 according to an embodiment may store the touch data in the correct answer database 234 based on an error being determined to be not present in a touch type determination.

For example, the processor 220 may store corresponding touch data in the correct answer database 234 by labeling the touch data with a "first touch type correct answer" based on an error being determined to be not present in the touch data determined as the first touch type. For example, the processor 220 may store corresponding touch data in the correct answer database 233 by labeling the touch data with a "second touch type correct answer" based on an error being determined to be not present in the touch data determined as the second touch type.

At operation 340, the processor 220 according to various embodiments of the disclosure may update a recognition model.

The processor 220 according to an embodiment of the disclosure may update a recognition model stored in the recognition model storage space 232 based on touch data stored in the wrong answer database 233 and the correct answer database 234.

According to an embodiment of the disclosure, the processor 220 may update a recognition model based on a designated condition being satisfied. For example, the processor 220 may update a recognition model based on the amount of touch data being stored in the wrong answer database 233 and/or the correct answer database 234 and being equal to or greater than a designated value. For example, the processor 220 may update a recognition model based on the electronic device 200 being not driven, the amount of remaining battery power of the electronic device 200 being equal to or greater than a designated value and/or a temperature of the electronic device 200 being equal to or smaller than a designated value.

According to an embodiment of the disclosure, the processor 220 may determine a recognition model based on touch data stored in the wrong answer database 233 and/or the correct answer database 234.

According to an embodiment of the disclosure, the processor 220 may determine a recognition model by learning touch data stored in the wrong answer database 233 and/or the correct answer database 234. For example, the processor 220 may determine a recognition model by learning touch data labeled with a "first touch type wrong answer" or touch data labeled with a "second touch type wrong answer", which are stored in the wrong answer database 233, or touch data labeled with a "first touch type correct answer" or touch data labeled with a "second touch type correct answer", which are stored in the correct answer database 234.

For example, the processor 220 may determine a recognition model that determines a type of the first touch type and/or the second touch type by learning touch data stored in the wrong answer database 233 and/or the correct answer database 234. For example, the processor 220 may determine a recognition pattern which is a criterion for determining a type of the first touch type and/or the second touch type by learning touch data stored in the wrong answer database 233 and/or the correct answer database 234.

According to an embodiment of the disclosure, the processor 220 may determine a recognition model to be used in a touch type determination, among a plurality of recognition models stored in the recognition model storage space 232, based on touch data stored in the wrong answer database 233 and/or the correct answer database 234. For example, the processor 220 may input, to a plurality of recognition models, touch data stored in the wrong answer database 233 and/or the correct answer database 234, and may determine a recognition model having the highest recognition performance as a recognition model to be used in a touch type determination. For example, the processor 220 may determine, as a recognition model to be used in a touch type determination, a recognition model based on a recognition pattern having the highest performance and/or suitability by analyzing touch data stored in the wrong answer database 233 and/or the correct answer database 234.

According to an embodiment of the disclosure, the processor 220 may update the recognition model storage space 232 with a determined recognition model. According to an embodiment of the disclosure, the processor 220 may determine, as a recognition model to be used in a touch type determination, a recognition model determined among a plurality of recognition models of the recognition model storage space 232.

FIGS. 4A, 4B, 4C, and 4D are diagrams illustrated to describe determining, by a processor, a touch type of an inputted touch and determining whether an error is present in the touch type according to various embodiments of the disclosure.

Figure 4A:
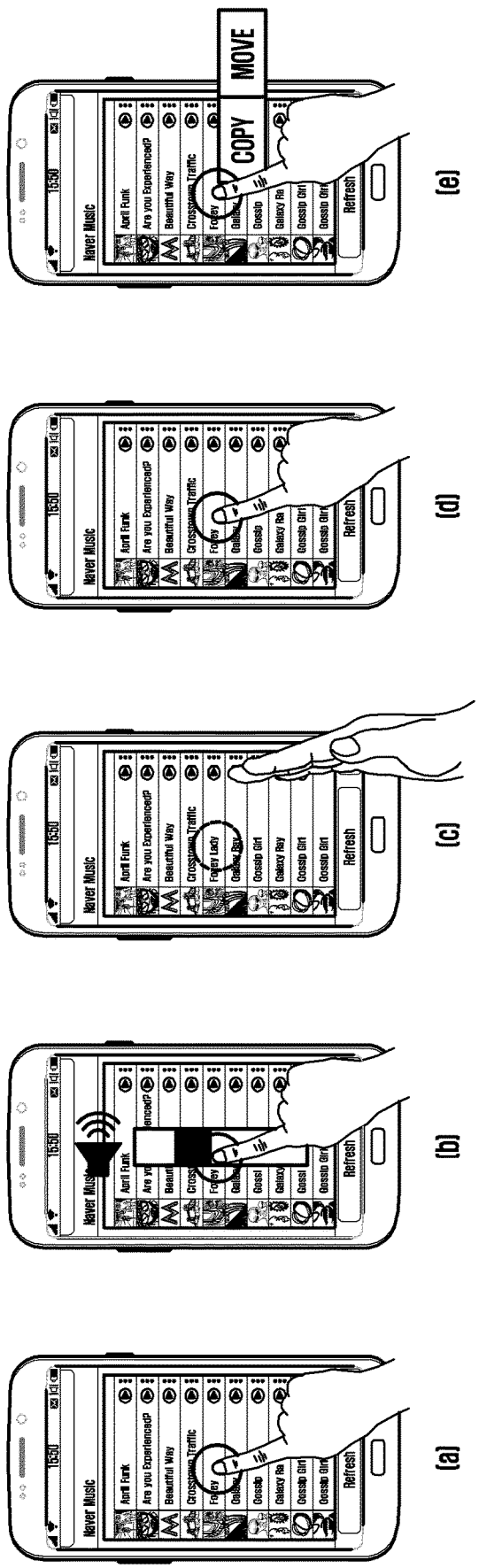

FIG. 4A is a diagram illustrated to describe determining, by the processor 220, a touch type of an inputted touch and determining whether an error is present in the determined touch type when a user inputs the touch to a touch screen with the intention of a long touch.

Referring to part (a) of FIG. 4A, a user may input a touch to a touch screen with the intention of a long touch. A touch type determination module (e.g., the touch type determination module 223 in FIG. 2) may determine a touch type as a force touch by inputting, to a recognition model, touch data of the touch inputted by the user.

Referring to part (b) of FIG. 4A, a main processor (e.g., the main processor 121 in FIG. 1) may output a force touch UI (e.g., a volume adjustment window UI) based on the force touch being determined by the touch type determination module 223.

Referring to part (c) of FIG. 4A, the user may detach a finger from the touch screen without manipulating the force touch UI based on the force touch UI being outputted not the intended long touch input. A touch error determination module (e.g., the touch error determination module 224 in FIG. 2) may determine that an error is present in the touch type determined as the force touch, based on touch coordinates being made to disappear as the user detaches the finger from the touch screen without receiving an additional manipulation from the user with respect to the force touch UI. According to an embodiment of the disclosure, the main processor 121 may stop the output of the force touch UI based on the error being determined to be present in the touch type determined as the force touch by the touch error determination module 224.

Referring to part (d) of FIG. 4A, the user may re-input a touch to the touch screen with the intention of a long touch. The touch type determination module 223 may determine, as the long touch, a touch type of the touch inputted by the user by inputting, to a recognition model, touch data of the touch inputted by the user.

Referring to part (e) of FIG. 4A, the main processor 121 may output a long touch UI (e.g., a selection window for copying or moving a selected area) based on the long touch being determined by the touch type determination module 223. The user may manipulate the long touch UI based on the intended long touch UI being outputted. The touch error determination module 224 may determine that an error is not present in the touch type determined as the long touch based on an input being obtained from the user and manipulating the long touch UI.

Figure 4B:
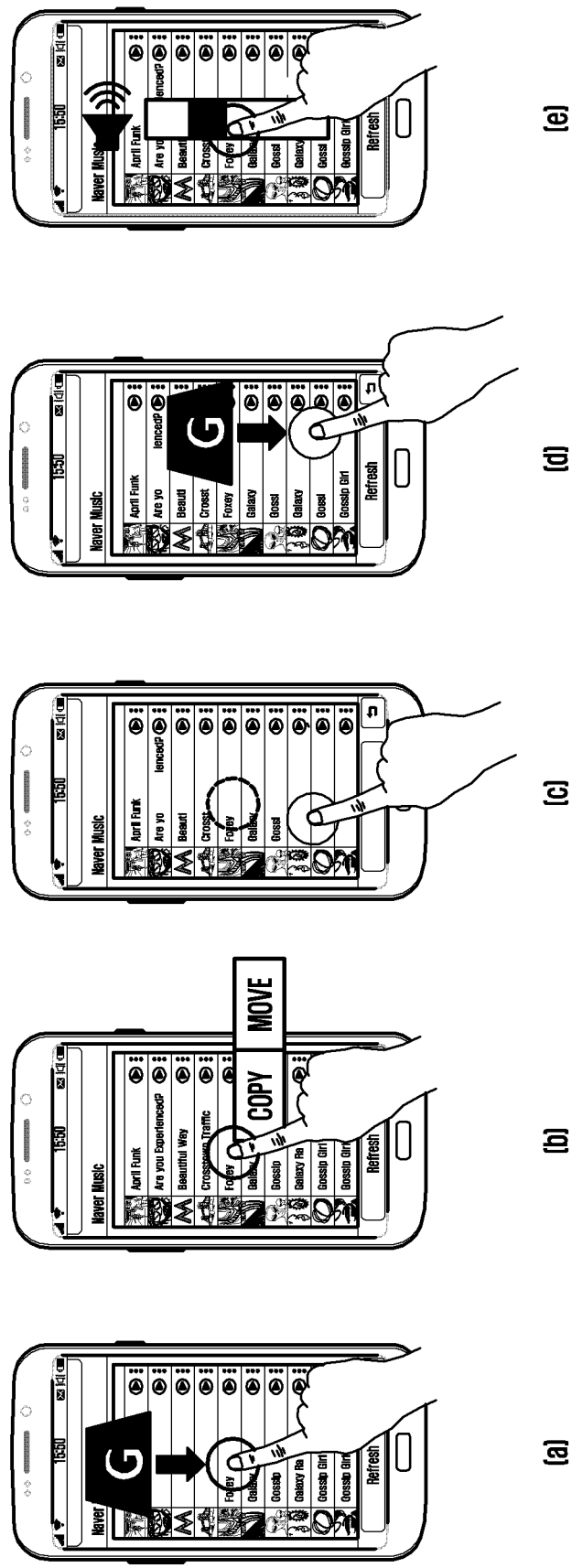

FIG. 4B is a diagram illustrated to describe determining, by a processor, a touch type of an inputted touch and determining whether an error is present in a determined touch type, when a user inputs the touch to a touch screen with the intention of a force touch.

Referring to part (a) of FIG. 4B, a user may input a touch to a touch screen with the intention of a force touch. The touch type determination module 223 may determine a touch type as a long touch by inputting, to a recognition model, touch data of the touch inputted by the user.

Referring to part (b) of FIG. 4B, the main processor 121 may output a long touch UI (e.g., a selection window UI for copying or moving a selected area) based on the long touch being determined by the touch type determination module 223.

Referring to part (c) of FIG. 4B, the user may touch another area of the touch screen without manipulating the long touch UI based on the long touch UI being outputted, not the input of the intended force touch. The touch error determination module 224 may determine that an error is present in the touch type determined as the long touch as the user touches the another area of the touch screen without receiving an additional manipulation from the user with respect to a long touch UI. According to an embodiment of the disclosure, the main processor 121 may stop the output of the long touch UI based on the error being determined to be present in the touch type determined as the long touch by the touch error determination module 224.

Referring to part (d) of FIG. 4B, the user may re-input a touch to the touch screen with the intention of a force touch. The touch type determination module 223 may determine, as the force touch, a touch type of the touch inputted by the user by inputting, to a recognition model, touch data of the touch inputted by the user.

Referring to part (e) of FIG. 4B, the main processor 121 may output a force touch UI (e.g., a volume adjustment window UI) based on the force touch being determined by the touch type determination module 223. The user may manipulate the force touch UI based on the intended force touch UI being outputted. The touch error determination module 224 may determine that an error is not present in the touch type determined as the force touch based on an input being obtained from the user and manipulating the force touch UI.

FIG. 4C is a diagram illustrated to describe determining, by a processor, a touch type of an inputted touch and determining whether an error is present in a determined touch type, when a user inputs a touch to a touch screen with an intention of a long touch in an electronic device including a rollable display.

Referring to part (a) of FIG. 4C, a user may input a touch to a touch screen with the intention of a long touch. The touch type determination module 223 may determine a touch type as a force touch by inputting, to a recognition model, touch data of the touch inputted by the user.

Referring to part (b) of FIG. 4C, the main processor 121 may output a force touch UI (e.g., screen size adjustment UI) based on the force touch being determined by the touch type determination module 223.

Referring to part (c) of FIG. 4C, the user may detach a finger from the touch screen without manipulating the force touch UI based on the force touch UI being outputted, not the input of the intended long touch. The touch error determination module 224 may determine that an error is present in the touch type determined as the force touch based on touch coordinates being made to disappear as the user detaches the finger from the touch screen without receiving an additional manipulation from the user with respect to the force touch UI. According to an embodiment of the disclosure, the main processor 121 may stop the output of the force touch UI based on the error being determined to be present in the touch type determined as the force touch by the touch error determination module 224.

Referring to part (d) of FIG. 4C, the user may re-input a touch to the touch screen with the intention of a long touch. The touch type determination module 223 may determine, as the long touch, a touch type of the touch inputted by the user by inputting, to a recognition model, touch data of the touch inputted by the user.

Referring to part (e) of FIG. 4C, the main processor 121 may output a long touch UI (e.g., a selection window for copying or moving a selected area) based on the long touch being determined by the touch type determination module 223. The user may manipulate the long touch UI based on the intended long touch UI being outputted. The touch error determination module 224 may determine that an error is not present in the touch type determined as the long touch based on an input being obtained from the user and manipulating the long touch UI.

Figure 4D:
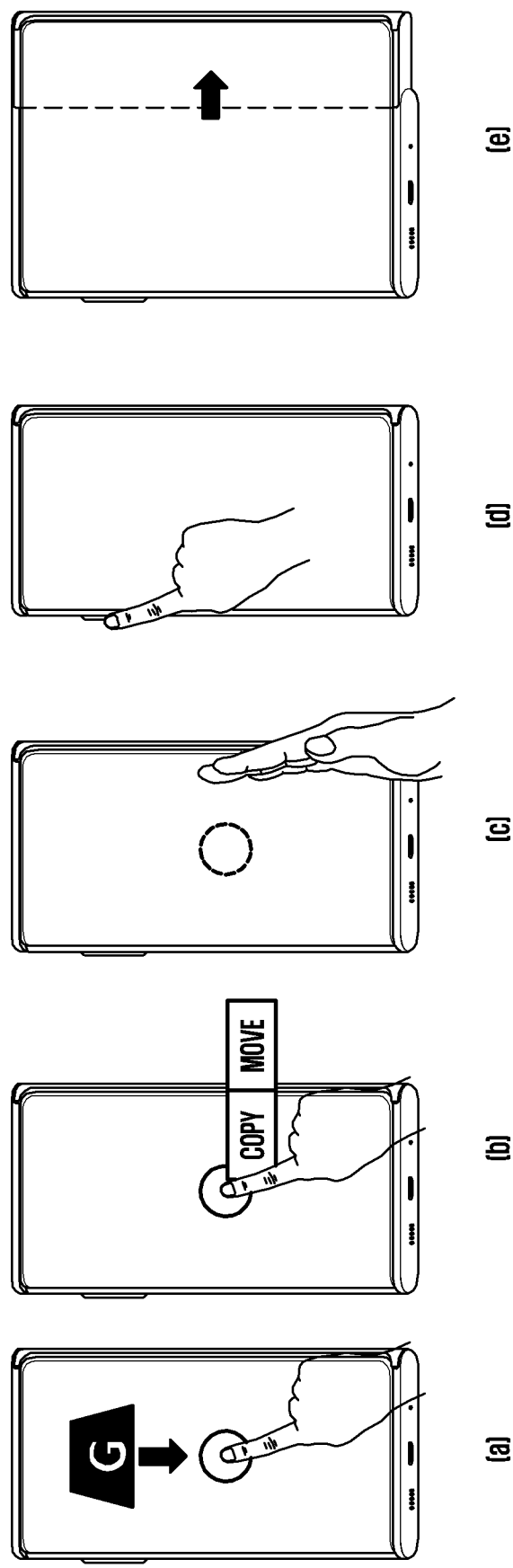

FIG. 4D is a diagram illustrated to describe determining, by a processor, a touch type of an inputted touch and determining whether an error is present in a determined touch type, when a user inputs a touch to a touch screen with an intention of a force touch in an electronic device including a rollable display.

Referring to part (a) of FIG. 4D, a user may input a touch to a touch screen with the intention of a force touch. The touch type determination module 223 may determine a touch type as a long touch by inputting, to a recognition model, touch data of the touch inputted by the user.

Referring to part (b) of FIG. 4D, the main processor 121 may output a long touch UI (e.g., a selection window UI for copying or moving a selected area) based on the long touch being determined by the touch type determination module 223.

Referring to part (c) of FIG. 4D, the user may detach a finger from the touch screen without manipulating the long touch UI based on the long touch UI being outputted, not the input of the intended force touch.

Referring to part (d) of FIG. 4D, the user may manipulate a physical key for an intended screen size adjustment. The touch error determination module 224 may determine that an error is present in the touch type determined as the long touch based on the physical key (e.g., a physical key for a screen size adjustment) being manipulated by the user without receiving an additional manipulation from the user with respect to the long touch UI. According to an embodiment of the disclosure, the main processor 121 may stop the output of the long touch UI based on the error being determined to be present in the touch type determined as the long touch by the touch error determination module 224.

Referring to part (e) of FIG. 4D, the main processor 121 may expand the screen size of a rollable display based on the physical key being clicked on by the user.

Figure 4E:
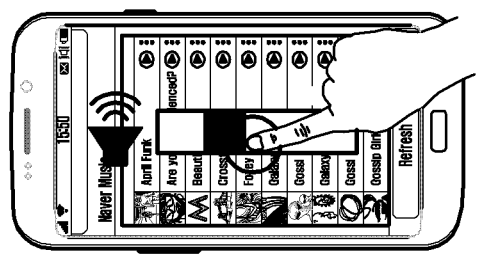
Figure 4E:
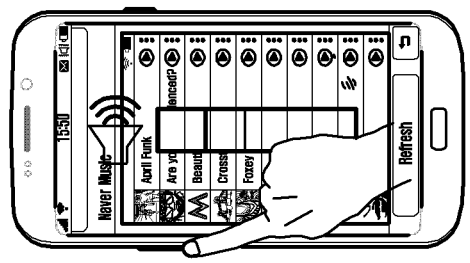
Figure 4E:
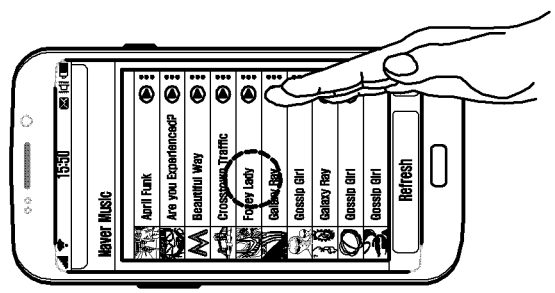
Figure 4E:
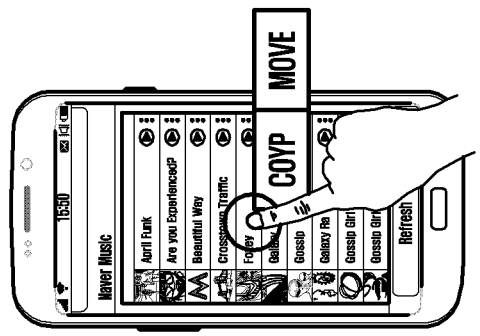
Figure 4E:
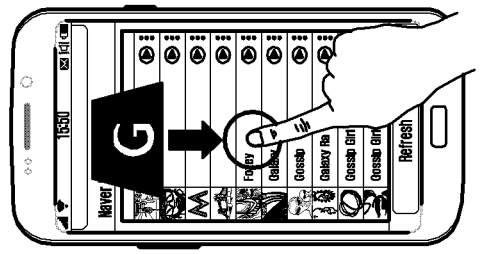

FIG. 4E is a diagram illustrated to describe determining, by a processor, a touch type of an inputted touch and determining whether an error is present in a determined touch type, when a user inputs a touch to a touch screen with an intention of a force touch according to an embodiment of the disclosure.

Referring to part (a) of FIG. 4E, a user may input a touch to a touch screen with the intention of a force touch. The touch type determination module 223 may determine a touch type as a long touch by inputting, to a recognition model, touch data of the touch inputted by the user.

Referring to part (b) of FIG. 4E, the main processor 121 may output a long touch UI (e.g., a selection window UI for copying or moving a selected area) based on the long touch being determined by the touch type determination module 223.

Referring to part (c) of FIG. 4E, the user may detach a finger from the touch screen without manipulating the long touch UI based on the long touch UI being outputted, not the input of the intended force touch.

Referring to part (d) of FIG. 4E, the user may manipulate a physical key for an intended volume size adjustment. The touch error determination module 224 may determine that an error is present in the touch type determined as the long touch based on the physical key (e.g., a physical key for a volume size adjustment) being manipulated by the user without receiving an additional manipulation from the user with respect to the long touch UI. According to an embodiment of the disclosure, the main processor 121 may stop the output of the long touch UI based on the error being determined to be present in the touch type determined as the long touch by the touch error determination module 224.

Referring to part (e) of FIG. 4E, the main processor 121 may adjust a volume based on the physical key being clicked on by the user.

According to an embodiment of the disclosure, the touch error determination module 224 may store, in the wrong answer database 233, touch data corresponding to the user input in part (a) of FIG. 4A to part (e) of FIG. 4E by labeling the touch data with a "long touch wrong answer" or a "force touch wrong answer" based on a determined touch type of a touch corresponding to the user input in part (a) of FIGS. 4A to 4E. According to an embodiment of the disclosure, the touch error determination module 224 may store, in the correct answer database 234, touch data corresponding to the user input in part (d) of FIGS. 4A to 4E by labeling the touch data with a "long touch correct answer" or a "force touch correct answer." According to another embodiment of the disclosure, the touch error determination module 224 may store, in a database including the wrong answer database 233 and the correct answer database 234, the touch data corresponding to the user input in part (a) of FIGS. 4A to 4E by labeling the touch data with a "long touch wrong answer" or a "force touch wrong answer" and the touch data corresponding to the user input in part (d) of FIGS. 4A to 4C by labeling the touch data with a "long touch correct answer" or a "force touch correct answer."

Figure 5A:
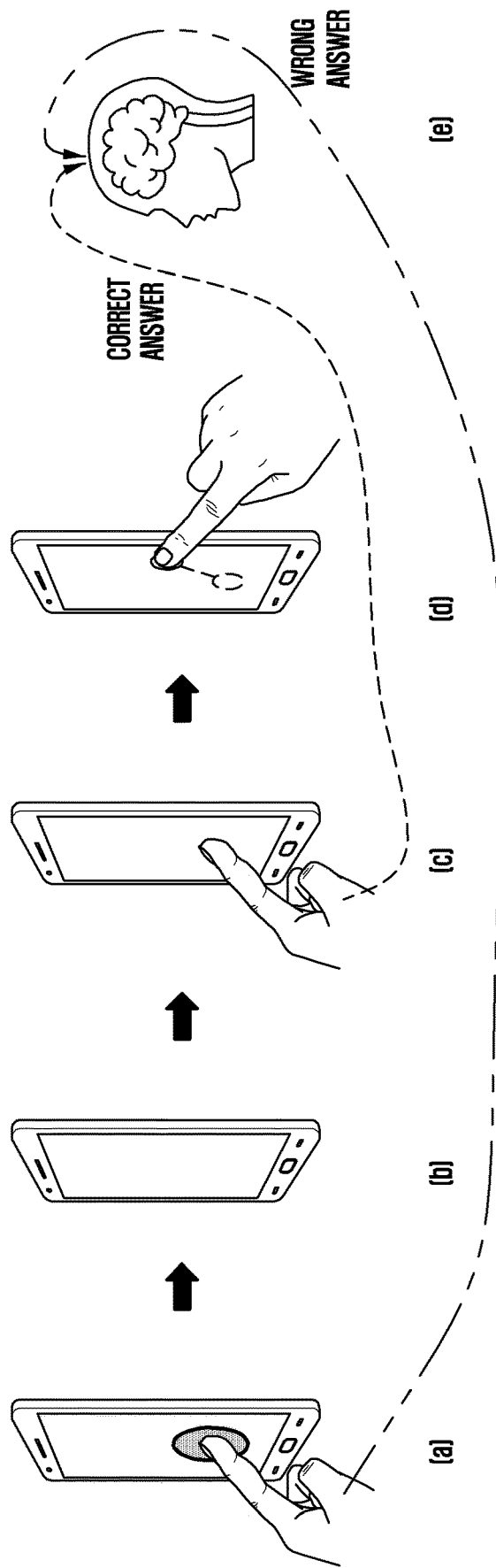
FIGS. 5A and 5B are diagrams illustrated to describe a storing, by a processor, touch data in a correct answer database and/or a wrong answer database based on an error being present in a touch type according to various embodiments of the disclosure.
Figure 5B:
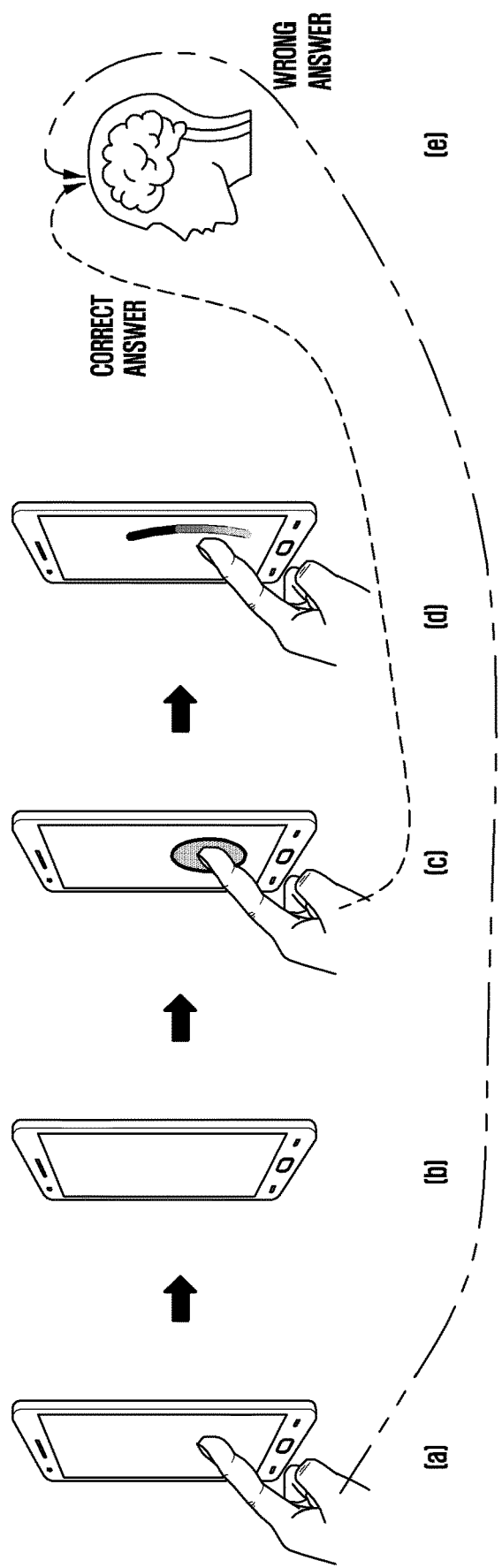

FIGS. 5A and 5B are diagrams illustrated to describe storing, by a processor, touch data in a correct answer database and/or a wrong answer database based on an error being present in a touch type according to various embodiments of the disclosure.

Referring to FIG. 5A is a diagram illustrated to describe determining, by the processor 220, a touch type of an inputted touch when a user inputs a touch with the intention of a long touch and storing the touch data in a correct answer database (e.g., the correct answer database 233 in FIG. 2) and/or a wrong answer database (e.g., the wrong answer database 234 in FIG. 2) based on an error being present in the touch type determination.

Referring to part (a) of FIG. 5A, a user may input a touch with the intention of a long touch. The touch type determination module 223 may determine, as a force touch, a touch type of the touch inputted by the user.

Referring to part (b) of FIG. 5A, a main processor (e.g., the main processor 121 in FIG. 1) may output a force touch UI (e.g., a volume adjustment window UI) based on the force touch being determined by the touch type determination module 223. The user may detach a finger from a display without manipulating the force touch UI based on the force touch UI being outputted, not the input of the intended long touch. The touch error determination module 224 may determine that an error is present in the touch type determined as the force touch based on touch coordinates being made to disappear as the user detaches a finger from the display without receiving an additional manipulation from the user with respect to the force touch UI.

Referring to part (c) of FIG. 5A, the user may re-input a touch to with the intention of a long touch. The touch type determination module 223 may determine, as a long touch, a touch type of the touch inputted by the user.

Referring to part (d) of FIG. 5A, the main processor 121 may output a long touch UI (e.g., a selection window UI for copying or moving a selected area) based on the long touch being determined by the touch type determination module 223. The user may manipulate the long touch UI based on the intended long touch UI being outputted. The touch error determination module 224 may determine that an error is not present in the touch type determined as the long touch based on an input being obtained from the user and manipulating the long touch UI.

Referring to part (e) of FIG. 5A, the touch error determination module 224 may store, in the wrong answer database 233, touch data corresponding to the touch input in part (a) of FIG. 5A by labeling the touch data with a "force touch wrong answer", and may store, in the correct answer database 234, touch data corresponding to the user input in part (d) of FIG. 5A by labeling the touch data with a "long touch correct answer." According to another embodiment of the disclosure, the touch error determination module 224 may store, in a database including the wrong answer database 233 and the correct answer database 234, the touch data corresponding to the touch input in part (a) of FIG. 5A by labeling the touch data with a "force touch wrong answer" and the touch data corresponding to the user input in part (d) of FIG. 5A by labeling the touch data with a "long touch correct answer."

FIG. 5B is a diagram illustrated to describe determining, by a processor, a touch type of an inputted touch when a user inputs a touch with an intention of a force touch and storing touch data in correct answer database and/or wrong answer database based on an error being present in a touch type determination according to an embodiment of the disclosure.

Referring to part (a) of FIG. 5B, a user may input a touch with the intention of a force touch. The touch type determination module 223 may determine, as a long touch, a touch type of the touch inputted by the user.

Referring to part (b) of FIG. 5B, the main processor 121 may output a long touch UI (e.g., a selection window UI for copying or moving a selected area) based on the long touch being determined by the touch type determination module 223. The user may detach a finger from a display without manipulating the long touch UI based on the long touch UI being outputted, not the input of the intended force touch. The touch error determination module 224 may determine that an error is present in the touch type determined as the long touch based on touch coordinates being made to disappear as the user detaches a finger from the display without receiving an additional manipulation from the user with respect to the long touch UI.

Referring to part (c) of FIG. 5B, the user may re-input a touch to with the intention of a force touch. The touch type determination module 223 may determine, as a force touch, a touch type of the touch inputted by the user.

Referring to part (d) of FIG. 5B, the main processor 121 may output a force touch UI (e.g., a volume adjustment window UI) based on the force touch being determined by the touch type determination module 223. The user may manipulate the force touch UI based on the intended force touch UI being outputted. The touch error determination module 224 may determine that an error is not present based on an input being obtained from the user and manipulating the force touch UI.

Referring to part (e) of FIG. 5B, the touch error determination module 224 may store, in the wrong answer database 233, touch data corresponding to the user input in part (a) of FIG. 5B by labeling the touch data with a "long touch wrong answer", and may store, in the correct answer database 234, touch data corresponding to the user input in part (d) of FIG. 5B by labeling the touch data with a "force touch correct answer." According to another embodiment of the disclosure, the touch error determination module 224 may store, in a database including the wrong answer database 233 and the correct answer database 234, the touch data corresponding to the touch input in part (a) of FIG. 5B by labeling the touch data with a "long touch wrong answer" and the touch data corresponding to the user input in part (d) of FIG. 5B by labeling the touch data with a "force touch correct answer."

Figure 6:
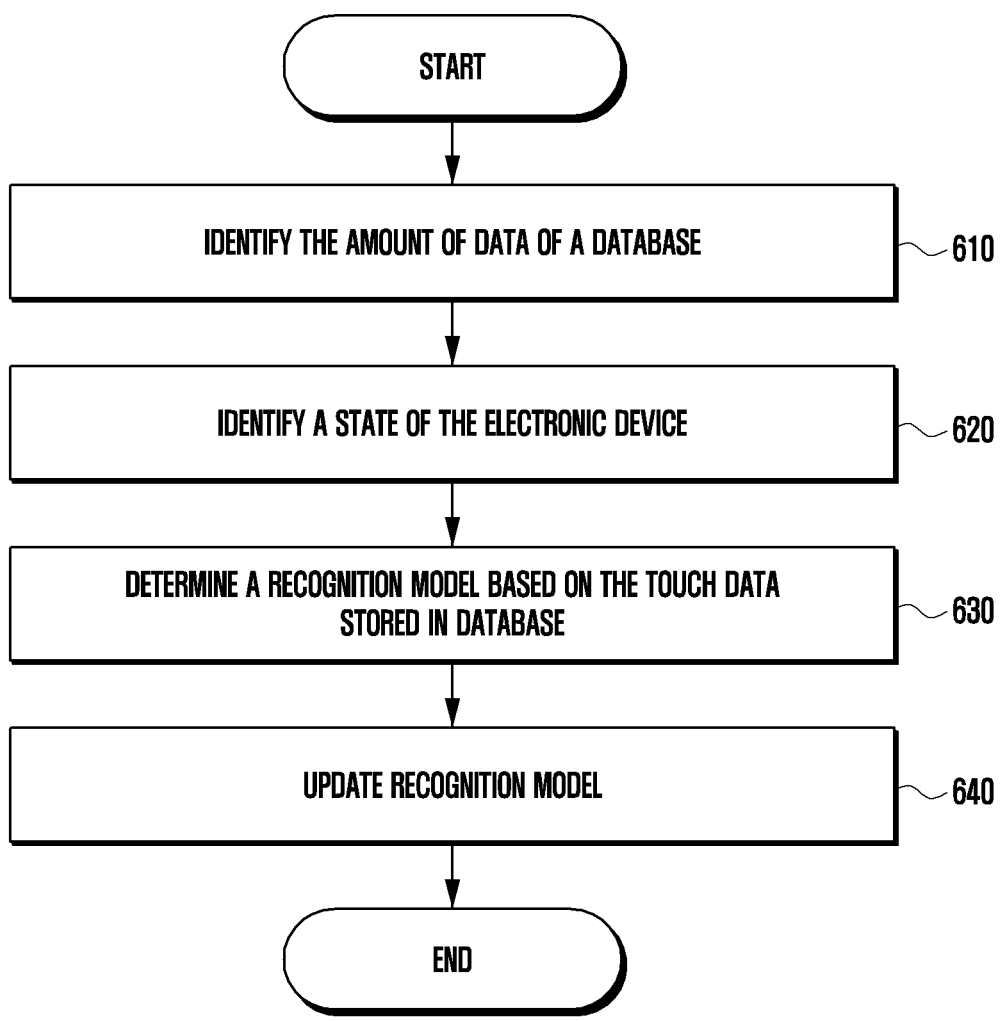
FIG. 6 is a flowchart illustrating a method of controlling, by a processor, an electronic device to update a recognition model according to an embodiment of the disclosure.

FIG. 6 is a flowchart illustrating a method of controlling, by a processor, an electronic device to update a recognition model according to an embodiment of the disclosure.

Referring to FIG. 6, at operation 610, the processor 220 according to various embodiments may identify the amount of data of a database.

According to an embodiment of the disclosure, the processor 220 may identify the amount of touch data stored in a wrong answer database (e.g., the wrong answer database 233 in FIG. 2) and/or a correct answer database (e.g., the correct answer database 234 in FIG. 2).

According to an embodiment of the disclosure, the processor 220 may perform operation 620 based on the amount of the touch data stored in the wrong answer database 233 and/or the correct answer database 234, which is equal to or greater than a designated value.

At operation 620, the processor 220 according to various embodiments of the disclosure may identify a state of the electronic device 200.

According to an embodiment of the disclosure, the processor 220 may identify whether a state of the electronic device 200 is a designated state. For example, the processor 220 may identify whether the electronic device 200 is driving. For example, the processor 220 may identify the amount of remaining battery power of the electronic device 200. For example, the processor 220 may identify a temperature of the electronic device 200.

According to an embodiment of the disclosure, the processor 220 may perform operation 630 based on the state of the electronic device 200 being the designated state. For example, the processor 220 may perform operation 630 based on the electronic device 200 being not driven, the amount of remaining battery power of the electronic device 200 being equal to or greater than a designated value and/or a temperature of the electronic device 200 being equal to or smaller than a designated value.

At operation 630, the processor 220 according to various embodiments of the disclosure may determine a recognition model based on the touch data stored in the wrong answer database 233 and/or the correct answer database 234.

According to an embodiment of the disclosure, the processor 220 may determine a recognition model by learning touch data stored in the wrong answer database 233 and/or the correct answer database 234. For example, the processor 220 may determine a recognition model by learning touch data labeled with a "first touch type wrong answer" and/or touch data labeled with a "second touch type wrong answer" stored in the wrong answer database 233 or touch data labeled with a "first touch type correct answer" and/or touch data labeled with a "second touch type correct answer" stored in the correct answer database 234.

For example, the processor 220 may determine a recognition model that determines a type of a first touch type and/or a second touch type by learning touch data stored in the wrong answer database 233 and/or the correct answer database 234. For example, the processor 220 may determine a recognition pattern which is a criterion for determining a type of the first touch type and/or the second touch type by learning touch data stored in the wrong answer database 233 and/or the correct answer database 234.

According to an embodiment of the disclosure, the processor 220 may determine a recognition model to be used in the touch type determination module 223, among a plurality of recognition models stored in the recognition model storage space 232, based on touch data stored in the wrong answer database 233 and/or the correct answer database 234. For example, the processor 220 may input, to a plurality of recognition models, touch data stored in the wrong answer database 233 and/or the correct answer database 234, and may determine a recognition model having the highest recognition performance as a recognition model to be used in the touch type determination module 223. For example, the processor 220 may determine, as a recognition model to be used in the touch type determination module 223, a recognition model based on a recognition pattern having the highest performance and/or suitability by analyzing touch data stored in the wrong answer database 233 and/or the correct answer database 234.

At operation 640, the processor 220 according to various embodiments may update a recognition model.

According to an embodiment of the disclosure, the processor 220 may update the recognition model storage space 232 with the recognition model determined at operation 630.

According to an embodiment of the disclosure, the processor 220 may determine the recognition model determined at operation 630 as a recognition model to be used in the touch type determination module 223 among the plurality of recognition models of the recognition model storage space 232.

According to an embodiment of the disclosure, the processor 220 may determine a touch type of an inputted touch based on the updated recognition model.

Figure 7:
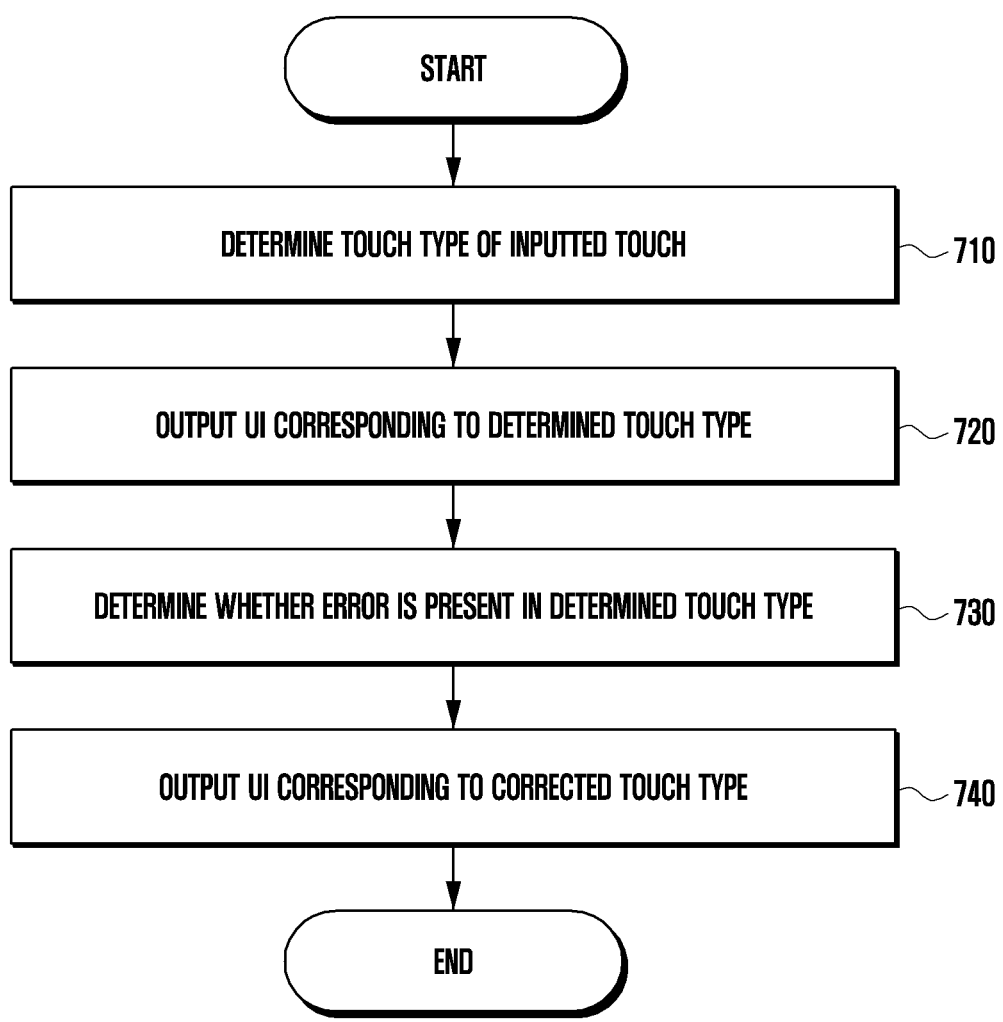
FIG. 7 is a flowchart illustrating a method of controlling, by a processor, an electronic device to output a user interface (UI) based on an error of a touch type determination according to an embodiment of the disclosure.

FIG. 7 is a flowchart illustrating a method of controlling, by a processor an electronic device to output a UI based on an error of a touch type determination according to an embodiment of the disclosure.

Referring to FIG. 7, at operation 710, the processor 220 may determine a touch type of an inputted touch.

For example, the processor 220 may determine, as a first touch type and/or a second touch type, a touch type of a user input inputted to a touch sensor (e.g., the touch sensor 276 in FIG. 2). For example, the first touch type and/or the second touch type may be a long touch and/or a force touch.

According to an embodiment of the disclosure, the processor 220 may determine a touch type of a user input based on touch data, that is, image data corresponding to the user input, and a recognition model. For example, the processor 220 may determine the touch type as the first touch type and/or the second touch type based on a value obtained by inputting the touch data to the recognition model. For example, the processor 220 may determine the touch type as the first touch type based on the value obtained by inputting the touch data to the recognition model, which is equal to or greater than a designated value, and may determine the touch type as the second touch type based on the value being less than the designated value.

According to an embodiment of the disclosure, the processor 220 may determine a touch type of a user input based on touch pressure obtained from the touch sensor 276. For example, the processor 220 may determine the touch type of the user input as the first touch type based on the touch pressure being equal to or greater than a designated value, and may determine the touch type as the second touch type based on the touch pressure being less than the designated value.

According to various embodiments of the disclosure, at operation 720, the processor 220 may output a UI corresponding to the determined touch type.

According to an embodiment of the disclosure, the processor 220 may perform an operation based on the determined touch type. For example, the processor 220 may output a UI corresponding to the touch type. For example, the processor 220 may output a UI (e.g., a volume adjustment window UI and/or a screen size adjustment window UI) corresponding to the first touch type based on the touch type being determined as the first touch type. For example, the processor 220 may output a UI (e.g., a selection window UI for copying or moving a selected area) corresponding to the second touch type based on the touch type being determined as the second touch type. According to an embodiment of the disclosure, the processor 220 may output a UI corresponding to a touch type previously set in an application based on the application being executed.

According to various embodiments of the disclosure, at operation 730, the processor 220 may determine whether an error is present in the determined touch type.

According to an embodiment of the disclosure, the processor 220 may determine that an error is present in a touch type determination based on a designated condition being satisfied.

For example, the processor 220 may determine that an error is present in a touch type determined as the first touch type based on an additional manipulation being not received from a user with respect to a UI related to the first touch type and touch location coordinates being made to disappear as a touch target brought into contact with a touch screen is separated within a designated time, after an inputted touch is determined as the first touch type and the UI related to the first touch type is outputted.

For example, the processor 220 may determine that an error is present in a determination of a touch type (e.g., the second touch type) based on an additional manipulation being not received from a user with respect to a UI related to the second touch type and a touch target touching another area of a touch screen, after an inputted touch is determined as the second touch type and the UI related to the second touch type is outputted.

For example, the processor 220 may determine that an error is present in a determination of a touch type (e.g., the second touch type) based on an additional manipulation being not received from a user with respect to a UI related to the second touch type and pressure being applied to the same area by the touch target, after an inputted touch is determined as the second touch type and the UI related to the second touch type is outputted.

According to an embodiment of the disclosure, the processor 220 may determine that an error is not present in a touch type determination based on a designated condition being satisfied. For example, the processor 220 may determine that an error is not present in a touch type determination based on an input being obtained from a user and manipulating a UI corresponding to a determined touch type. For example, the processor 220 may determine that an error is not present in a touch type determination as the first touch type based on an input being obtained from a user and manipulating a first touch type UI. For example, the processor 220 may determine that an error is not present in a touch type determination as the second touch type based on an input being obtained from a user and manipulating a second touch type UI.

According to various embodiments of the disclosure, at operation 740, the processor 220 may output a UI corresponding to a corrected touch type.

According to an embodiment of the disclosure, the processor 220 may correct a touch type of a user input based on an error being present in a touch type determination. For example, the processor 220 may correct a touch type as a second touch type based on an error being determined to be present in the first touch type determined as a first touch type. For example, the processor 220 may correct a touch type as a first touch type based on an error being determined to be present in the first touch type determined as a second touch type.

According to an embodiment of the disclosure, the processor 220 may perform an operation based on a corrected touch type. For example, the processor 220 may stop the output of a UI corresponding to the first touch type, and may output a UI corresponding to the corrected touch type. For example, the processor 220 may stop the output of a UI corresponding to a second touch type based on a touch type being corrected as a first touch type, and may output a UI (e.g., a volume adjustment window UI and/or a screen size adjustment window UI) corresponding to the first touch type. For example, the processor 220 may stop the output of a UI corresponding to a first touch type based on a touch type being corrected as a second touch type, and may output a UI (e.g., a selection window UI for copying or moving a selected area) corresponding to the second touch type. According to an embodiment of the disclosure, the processor 220 may output a UI corresponding to a touch type previously set in an application based on the application being executed.

Figure 8A:
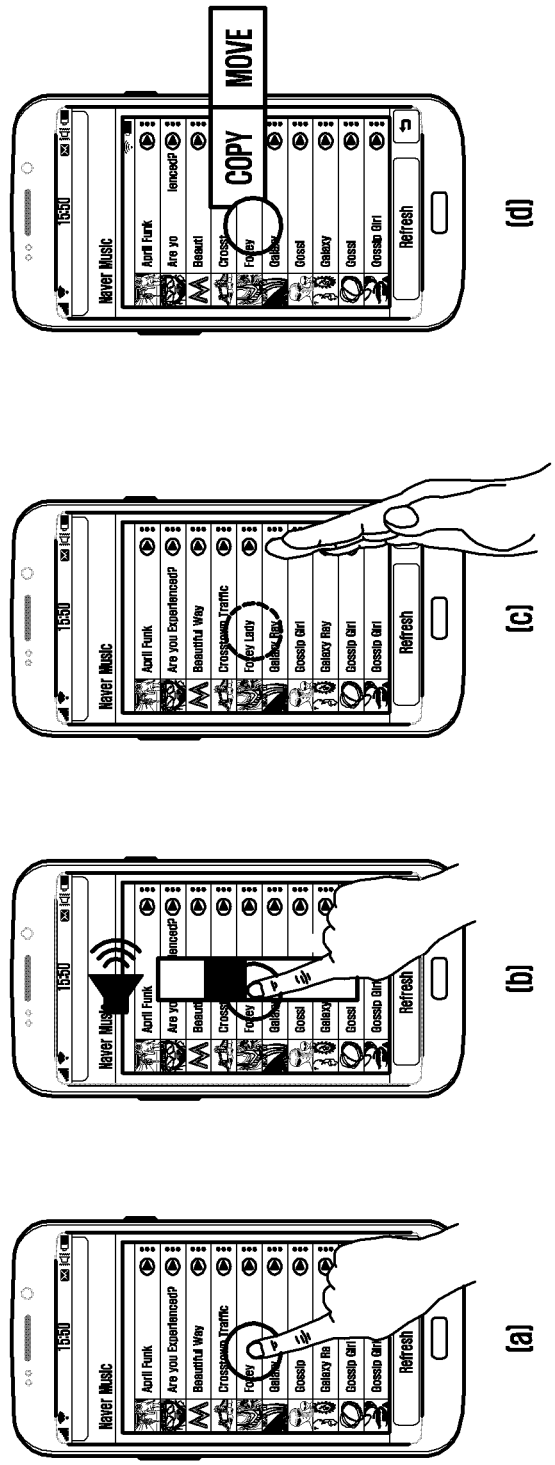
FIGS. 8A and 8B are diagrams illustrated to describe outputting, by a processor, a UI corresponding to a corrected touch type based on an error of a touch type determination according to various embodiments of the disclosure.
Figure 8B:
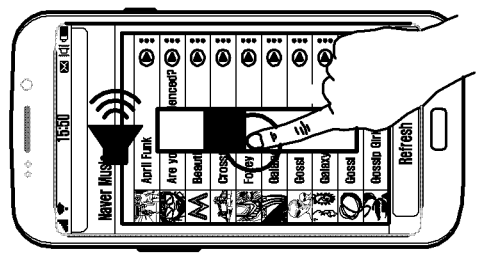
Figure 8B:
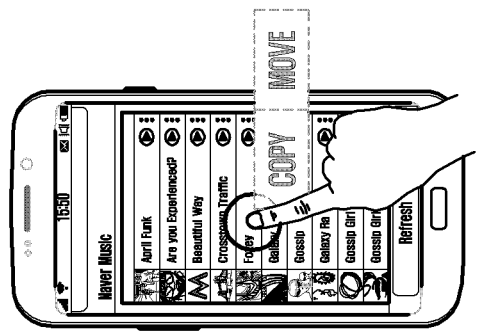
Figure 8B:
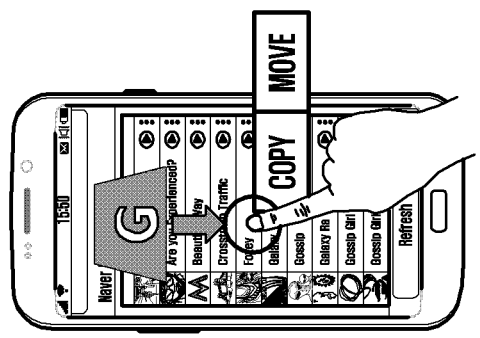
Figure 8B:
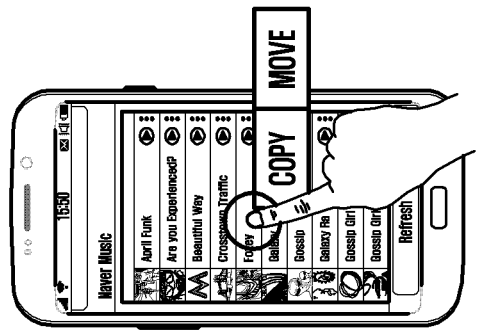
Figure 8B:
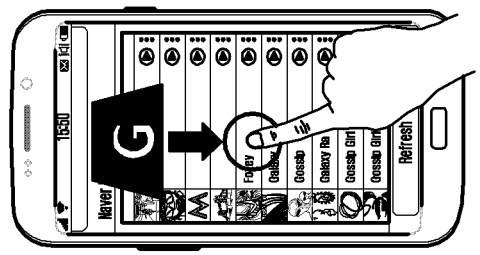

FIGS. 8A and 8B are diagrams illustrated to describe outputting, by a processor, a UI corresponding to a corrected touch type based on an error of a touch type determination according to various embodiments of the disclosure.

FIG. 8A is a diagram illustrated to describe outputting, by the processor 220, a UI corresponding to a long touch based on an error of a touch type determination when a user inputs a touch with the intention of a long touch.

Referring to part (a) of FIG. 8A, a user may input a touch to a touch screen with the intention of a long touch. The processor 220 may determine a touch type as a force touch by inputting, to a recognition model, touch data of the touch inputted by the user. The processor 220 may determine the touch type as the force touch based on pressure of the touch inputted by the user.

Referring to part (b) of FIG. 8A, the processor 220 may output a force touch UI (e.g., a volume adjustment window UI) based on the touch type being determined as the force touch.

Referring to part (c) of FIG. 8A, the user may detach a finger from the touch screen without manipulating the force touch UI based on the force touch UI being outputted not the input of the intended long touch. The processor 220 may determine that an error is present in the touch type determined as the force touch based on touch coordinates being made to disappear as the user detaches the finger from the touch screen without receiving an additional manipulation from the user with respect to the force touch UI. The processor 220 may stop the output of the force touch UI based on the error being determined to be present in the touch type determined as the force touch. According to an embodiment of the disclosure, the processor 220 may stop the output of the force touch UI and control the display 160 so that the force touch UI disappears from a display (e.g., the display module 160 in FIG. 1), based on an error being determined to be present in the touch type determined as the force touch after some of the force touch UI is outputted or in the middle of being outputted.

Referring to part (d) of FIG. 8A, the processor 220 may correct the touch type of the user input as a long touch based on an error being present in the touch type determined as the force touch. The processor 220 may output a long touch UI (e.g., a selection window UI for copying or moving a selected area) based on the touch type being corrected as the long touch.

FIG. 8B is a diagram illustrated to describe outputting, by a processor, a UI corresponding to a force touch based on an error of a touch type determination when a user inputs a touch with the intention of a force touch.

Referring to part (a) of FIG. 8B, a user may input a touch to a touch screen with the intention of a force touch. The processor 220 may determine a touch type as a long touch by inputting, to a recognition model, touch data of the touch inputted by the user. The processor 220 may determine the touch type as the long touch based on pressure of the touch inputted by the user.

Referring to part (e) of FIG. 8B, the processor 220 may output a long touch UI (e.g., a selection window UI for copying or moving a selected area) based on the touch type being determined as the long touch.

Referring to part (c) of FIG. 8B, the user may apply pressure to the touch screen again without manipulating the long touch UI based on the long touch UI being outputted, not the output of the intended force touch. The processor 220 may determine that an error is present in the touch type determined as the long touch based on the pressure being applied to the touch screen again by the user without receiving an additional manipulation from the user with respect to the long touch UI.

Referring to part (d) of FIG. 8B, the processor 220 may stop the output of the long touch UI based on the error being determined to be present in the touch type determined as the long touch. According to an embodiment of the disclosure, the processor 220 may control the display 160 so that the long touch UI disappears from the display 160 by gradually changing an alpha blending value in the long touch UI based on the error being determined to be present in the touch type determined as the long touch.

Referring to part (d) of FIG. 8B, the processor 220 may correct the touch type of the user input as a force touch based on the error being determined to be present in the touch type determined as the long touch. The processor 220 may output a force touch UI (e.g., a volume adjustment window UI) based on the touch type being corrected as the force touch.

An electronic device according to various embodiments of the disclosure may include a touch screen and the processor 220. The processor 220 may determine, as any one of a first touch type or a second touch type, the type of user input inputted on the touch screen, may output a user interface (UI) corresponding to the first touch type based on the type of inputted touch being determined as the first touch type, may correct the determined type as the second touch type based on an error being determined to be present in the type of inputted touch determined as the first touch type, and may output a UI corresponding to the second touch type.

In the electronic device according to various embodiments of the disclosure, the first touch type and the second touch type may be a force touch being a type in which the type of user input inputted on the touch screen comes into contact with the touch screen with designated pressure or more or a long touch being a type in which the type of user input on the touch screen comes into contact with the touch screen for a designated time or more.

In the electronic device according to various embodiments of the disclosure, the electronic device may further include a memory 230 storing a recognition model. The processor 220 may determine the type of user input based on a value obtained by inputting, to the recognition model, image data corresponding to the user input.

In the electronic device according to various embodiments of the disclosure, the processor 220 may input, to the recognition model, the image data based on the user input being inputted on the touch screen for a designated time or more, and may determine the type of user input as the first touch type based on the value being obtained by inputting the image data to the recognition model and being a designated value or more.

In the electronic device according to various embodiments of the disclosure, the processor 220 may store the image data of the user input in the memory 230 based on the error being determined to be present in determining the type of user input as the first touch type, and may update the recognition model by learning the image data.

In the electronic device according to various embodiments of the disclosure, the touch screen may further include a pressure sensor detecting pressure of a touch. The processor 220 may obtain pressure of the user input inputted on the touch screen, and may determine the type of user input as the first touch type based on a value of the pressure being a designated value or more.

In the electronic device according to various embodiments of the disclosure, the processor 220 may determine the error to be present in determining the type of user input as the first touch type based on a manipulation being not received for a designated time with respect to the UI corresponding to the first touch type.

In the electronic device according to various embodiments of the disclosure, the processor 220 may determine the error to be present in determining the type of user input as the first touch type based on a user input being additionally inputted to another area of the touch screen after the UI corresponding to the first touch type is outputted.

In the electronic device according to various embodiments of the disclosure, the first touch type may be the force touch, and the second touch type may be the long touch. The processor 220 may output a UI corresponding to the force touch based on the type of user input being determined as the force touch, may determine an error to be present in determining the type of user input as the force touch, based on the user input being terminated without receiving an additional user input in the UI corresponding to the force touch for a designated time, and may output a UI corresponding to the long touch.

In the electronic device according to various embodiments of the disclosure, the first touch type may be the long touch, and the second touch type may be the force touch. The processor 220 may output a UI corresponding to the long touch based on the type of user input being determined as the long touch, may determine an error to be present in determining the type of user input as the long touch, based on an additional user input corresponding to the force touch being received without receiving an additional user input in the UI corresponding to the long touch for a designated time, and may output a UI corresponding to the force touch.

A method of an electronic device according to various embodiments of the disclosure may include determining, as any one of a first touch type or a second touch type, the type of user input inputted on the touch screen, outputting a UI corresponding to the first touch type based on the type of inputted touch being determined as the first touch type, correcting the determined type as the second touch type based on an error being determined to be present in determining the type of inputted touch as the first touch type, and outputting a UI corresponding to the second touch type.

In a method of an electronic device according to various embodiments of the disclosure, the first touch type and the second touch type may be a force touch being a type in which the type of user input inputted on the touch screen comes into contact with the touch screen with designated pressure or more or a long touch being a type in which the type of user input on the touch screen comes into contact with the touch screen for a designated time or more.

In a method of an electronic device according to various embodiments of the disclosure, the method may further include determining the type of user input based on a value obtained by inputting, to the recognition model, image data corresponding to the user input.

In a method of an electronic device according to various embodiments of the disclosure, the method may further include inputting, to the recognition model, the image data based on the user input being inputted on the touch screen for a designated time or more, and determining the type of user input as the first touch type based on the value being obtained by inputting the image data to the recognition model and being a designated value or more.

In a method of an electronic device according to various embodiments of the disclosure, the method may further include storing the image data of the user input in the memory 230 based on the error being determined to be present in determining the type of user input as the first touch type, and updating the recognition model by learning the image data.

In a method of an electronic device according to various embodiments of the disclosure, the method may further include obtaining pressure of the user input inputted on the touch screen, and determining the type of user input as the first touch type based on a value of the pressure being a designated value or more.

In a method of an electronic device according to various embodiments of the disclosure, the method may further include determining the error to be present in determining the type of user input as the first touch type based on a manipulation being not received for a designated time with respect to the UI corresponding to the first touch type.

In a method of an electronic device according to various embodiments of the disclosure, the method may further include determining the error to be present in determining the type of user input as the first touch type based on a user input being additionally inputted to another area of the touch screen after the UI corresponding to the first touch type is outputted.

In a method of an electronic device according to various embodiments of the disclosure, the first touch type may be the force touch, and the second touch type may be the long touch. The method may further include outputting a UI corresponding to the force touch based on the type of user input being determined as the force touch, determining an error to be present in determining the type of user input as the force touch, based on the user input being terminated without receiving an additional user input in the UI corresponding to the force touch for a designated time, and outputting a UI corresponding to the long touch.

In a method of an electronic device according to various embodiments of the disclosure, the first touch type may be the long touch, and the second touch type may be the force touch. The method may further include outputting a UI corresponding to the long touch based on the type of user input being determined as the long touch, determining an error to be present in determining the type of user input as the long touch, based on an additional user input corresponding to the force touch being received without receiving an additional user input in the UI corresponding to the long touch for a designated time, and outputting a UI corresponding to the force touch.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., through wires), wirelessly, or via a third element.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch screen; and
   at least one processor,
   wherein the at least one processor is configured to:
   determine, as any one of a first touch type or a second touch type, a type of a user input inputted on the touch screen, the type of user input being determined based on at least one of a touch length, a touch force or a touch area,
   output a first touch user interface (UI) corresponding to the first touch type based on the type of inputted touch being determined as the first touch type,
   determine an error to be present in determining the type of user input as the first touch type based on a user input being additionally inputted to another area of the touch screen outside of an area displayed as the first touch UI after the first touch UI corresponding to the first touch type is outputted,
   correct the determined type as the second touch type, and
   output a second touch UI corresponding to the second touch type.

2. The electronic device of claim 1, wherein the first touch type and the second touch type are a force touch being a type in which the type of user input inputted on the touch screen comes into contact with the touch screen with designated pressure or more or a long touch being a type in which the type of user input on the touch screen comes into contact with the touch screen for a designated time or more.

3. The electronic device of claim 2,
   wherein the first touch type is the force touch, and the second touch type is the long touch, and
   wherein the at least one processor is further configured to:
   output a force touch UI corresponding to the force touch based on the type of user input being determined as the force touch,
   determine an error to be present in determining the type of user input as the force touch, based on the user input being terminated without receiving an additional user input in the force touch UI corresponding to the force touch for a designated time, and
   output a long touch UI corresponding to the long touch.

4. The electronic device of claim 2,
   wherein the first touch type is the long touch, and the second touch type is the force touch, and
   wherein the at least one processor is further configured to:
   output a long touch UI corresponding to the long touch based on the type of user input being determined as the long touch,
   determine an error to be present in determining the type of user input as the long touch, based on an additional user input corresponding to the force touch being received without receiving an additional user input in the long touch UI corresponding to the long touch for a designated time, and
   output a force touch UI corresponding to the force touch.

5. The electronic device of claim 1, further comprising a memory storing a recognition model,
   wherein the at least one processor is further configured to determine the type of user input based on a value obtained by inputting, to the recognition model, image data corresponding to the user input.

6. The electronic device of claim 5, wherein the at least one processor is further configured to:
   input, to the recognition model, the image data based on the user input being inputted on the touch screen for a designated time or more, and
   determine the type of user input as the first touch type based on the value being obtained by inputting the image data to the recognition model and being a designated value or more.

7. The electronic device of claim 6, wherein the at least one processor is further configured to:
   store the image data of the user input in the memory based on the error being determined to be present in determining the type of user input as the first touch type, and
   update the recognition model by learning the image data.

8. The electronic device of claim 1,
   wherein the touch screen further comprises a pressure sensor detecting pressure of a touch, and
   wherein the at least one processor is further configured to:
   obtain pressure of the user input inputted on the touch screen, and
   determine the type of user input as the first touch type based on a value of the pressure being a designated value or more.

9. The electronic device of claim 1, wherein the at least one processor is further configured to determine the error to be present in determining the type of user input as the first touch type based on a manipulation being not received for a designated time with respect to the first touch UI corresponding to the first touch type.

10. A method of operating an electronic device, the method comprising:
    determining, as any one of a first touch type or a second touch type, a type of a user input inputted on a touch screen, the type of user input being determined based on at least one of a touch length, a touch force or a touch area;
    outputting a first touch user interface (UI) corresponding to the first touch type based on the type of inputted touch being determined as the first touch type;
    determining an error to be present in determining the type of user input as the first touch type based on a user input being additionally inputted to another area of the touch screen outside of an area displayed as the first touch UI after the first touch UI corresponding to the first touch type is outputted;
    correcting the determined type as the second touch type; and
    outputting a second touch UI corresponding to the second touch type.

11. The method of claim 10, wherein the first touch type and the second touch type are a force touch being a type in which the type of user input inputted on the touch screen comes into contact with the touch screen with designated pressure or more or a long touch being a type in which the type of user input on the touch screen comes into contact with the touch screen for a designated time or more.

12. The method of claim 11,
    wherein the first touch type is the force touch, and the second touch type is the long touch, and wherein the method further comprises:
outputting a force touch UI corresponding to the force touch based on the type of user input being determined as the force touch;
determining an error to be present in determining the type of user input as the force touch, based on the user input being terminated without receiving an additional user input in the force touch UI corresponding to the force touch for a designated time; and
outputting a long touch UI corresponding to the long touch.

13. The method of claim 11,
wherein the first touch type is the long touch, and the second touch type is the force touch, and
wherein the method further comprises:
outputting a long touch UI corresponding to the long touch based on the type of user input being determined as the long touch;
determining an error to be present in determining the type of user input as the long touch, based on an additional user input corresponding to the force touch being received without receiving an additional user input in the long touch UI corresponding to the long touch for a designated time; and
outputting a force touch UI corresponding to the force touch.

14. The method of claim 13, further comprising:
reducing a type classification error of a long touch and a force touch by updating a touch type determination model based on an individual characteristic of a user.

15. The method of claim 10, further comprising determining the type of user input based on a value obtained by inputting, to a recognition model, image data corresponding to the user input.

16. The method of claim 15, further comprising:
inputting, to the recognition model, the image data based on the user input being inputted on the touch screen for a designated time or more; and
determining the type of user input as the first touch type based on the value being obtained by inputting the image data to the recognition model and being a designated value or more.

17. The method of claim 16, further comprising:
storing the image data of the user input in a memory based on the error being determined to be present in determining the type of user input as the first touch type; and
updating the recognition model by learning the image data.

18. The method of claim 10, further comprising:
obtaining pressure of the user input inputted on the touch screen; and
determining the type of user input as the first touch type based on a value of the pressure being a designated value or more.

19. The method of claim 10, further comprising determining the error to be present in determining the type of user input as the first touch type based on a manipulation being not received for a designated time with respect to the first touch UI corresponding to the first touch type.

* * * * *